(12) United States Patent
Maziers

(10) Patent No.: US 9,676,170 B2
(45) Date of Patent: Jun. 13, 2017

(54) MULTILAYERED ROTOMOULDED ARTICLES

(71) Applicant: TOTAL RESEARCH & TECHNOLOGY FELUY, Seneffe (BE)

(72) Inventor: Eric Maziers, Seneffe (BE)

(73) Assignee: Total Research & Technology Feluy, Feluy (Seneffe) (BE)

(*) Notice: Subject to any disclaimer, the term of this patent is extended or adjusted under 35 U.S.C. 154(b) by 0 days.

(21) Appl. No.: 14/769,775

(22) PCT Filed: Feb. 28, 2014

(86) PCT No.: PCT/EP2014/053972
§ 371 (c)(1),
(2) Date: Aug. 21, 2015

(87) PCT Pub. No.: WO2014/135459
PCT Pub. Date: Sep. 12, 2014

(65) Prior Publication Data
US 2016/0001532 A1 Jan. 7, 2016

(30) Foreign Application Priority Data
Mar. 5, 2013 (EP) ..................... 13157835

(51) Int. Cl.
*B32B 27/12* (2006.01)
*B29C 41/22* (2006.01)
(Continued)

(52) U.S. Cl.
CPC ............ *B32B 27/12* (2013.01); *B29C 41/003* (2013.01); *B29C 41/04* (2013.01); *B29C 41/20* (2013.01);
(Continued)

(58) Field of Classification Search
CPC ....... B32B 27/065; B32B 27/38; B32B 27/36; B32B 27/32
See application file for complete search history.

(56) References Cited

U.S. PATENT DOCUMENTS

| 4,131,731 A | 12/1978 | Lai et al. |
| 5,053,485 A | 10/1991 | Nieuwenhuis et al. |

(Continued)

FOREIGN PATENT DOCUMENTS

| EP | 1777263 A1 | 4/2007 |
| EP | 2110406 A1 | 10/2009 |

(Continued)

OTHER PUBLICATIONS

International Search Report issued in PCT/EP2014/053972, dated May 13, 2014, 4 pages.
(Continued)

*Primary Examiner* — Hai Vo
(74) *Attorney, Agent, or Firm* — Albert Shung

(57) ABSTRACT

A rotomolded article may include at least one layer A containing fibers embedded in a polymer resin. The rotomolded article may include at least one layer B containing from 40 to 100 wt % of an aliphatic polyester. Such rotomolded articles may be prepared by applying to at least a part of an interior wall of a mold the at least one layer A, adding to the mold a composition for the at least one layer B, and rotating and heating the mold.

16 Claims, 8 Drawing Sheets

(51) Int. Cl.
   B32B 27/32     (2006.01)
   B29C 41/04     (2006.01)
   B32B 27/36     (2006.01)
   B32B 27/38     (2006.01)
   B32B 27/06     (2006.01)
   B29C 41/00     (2006.01)
   B29C 41/20     (2006.01)
   B32B 27/28     (2006.01)
   B32B 27/34     (2006.01)
   B32B 27/40     (2006.01)
   B29C 70/32     (2006.01)
   B29K 67/00     (2006.01)

(52) U.S. Cl.
   CPC ............ *B29C 41/22* (2013.01); *B32B 27/065* (2013.01); *B32B 27/281* (2013.01); *B32B 27/288* (2013.01); *B32B 27/32* (2013.01); *B32B 27/34* (2013.01); *B32B 27/36* (2013.01); *B32B 27/38* (2013.01); *B32B 27/40* (2013.01); *B29C 70/323* (2013.01); *B29K 2023/06* (2013.01); *B29K 2067/00* (2013.01); *B32B 2262/0253* (2013.01); *B32B 2262/0261* (2013.01); *B32B 2262/0276* (2013.01); *B32B 2262/101* (2013.01); *B32B 2262/103* (2013.01); *B32B 2262/106* (2013.01); *B32B 2266/025* (2013.01); *B32B 2266/0264* (2013.01); *B32B 2307/558* (2013.01)

(56) References Cited

U.S. PATENT DOCUMENTS

| | | |
|---|---|---|
| 5,053,522 A | 10/1991 | Muller |
| 5,117,008 A | 5/1992 | Bhatia et al. |
| 2005/0170118 A1* | 8/2005 | Cleveland ............ B32B 1/08 428/36.91 |
| 2005/0282000 A1 | 12/2005 | Howie, Jr. |
| 2006/0272478 A1* | 12/2006 | Steinhour ............ B29C 44/12 84/452 P |
| 2006/0292323 A1* | 12/2006 | Hutchinson ............ B05D 7/02 428/36.91 |
| 2009/0304962 A1 | 12/2009 | Rodgers |
| 2012/0211927 A1 | 8/2012 | Li et al. |

FOREIGN PATENT DOCUMENTS

| | | |
|---|---|---|
| EP | 2714769 A1 | 4/2014 |
| FR | 2843390 A1 | 2/2004 |
| WO | 9802480 A1 | 1/1998 |
| WO | 2008037772 A1 | 4/2008 |
| WO | 2010081887 A1 | 7/2010 |
| WO | 2010097463 A1 | 9/2010 |
| WO | 2011144625 A1 | 11/2011 |

OTHER PUBLICATIONS

Plastics Additives Handbook, ed. H. Zweifel, 5th edition, 2001, Hanser Publishers.

ShaoKun Chang et al., "Synthesis of polylactide-based thermoset resin and its curing kinetics", Polymer International 61, 2012, pp. 1492-1502.

Office Action issued in European Application No. 14707185.6, issued Mar. 1, 2017, 5 pages.

* cited by examiner

MULTILAYERED ROTOMOULDED ARTICLES

CROSS-REFERENCE TO RELATED APPLICATIONS

This application is a National Stage Entry of PCT/EP2014/053972, filed on Feb. 28, 2014, which claims priority from EP 13157835.3, filed on Mar. 5, 2013, the entireties of which are incorporated herein by reference.

FIELD OF THE INVENTION

The invention pertains to rotomoulded articles. In particular the invention relates to multilayered rotomoulded articles having at least two layers, and to methods for the manufacture thereof.

BACKGROUND OF THE INVENTION

The process of rotational moulding, also called rotomoulding, of plastic has been known since the 1940s for the preparation of hollow plastic articles.

This process involves adding a thermoplastic polymer into a mould, rotating the mould so that all the points of the internal surface of the mould are in contact with the polymer while heating the mould, so as to deposit the aforementioned molten polymer on the internal surface of the mould. Thereafter, a stage of cooling allows the solidification of the plastic article, which is then removed from the mould.

Rotational moulding is advantageous because it avoids applying stress and strain to the plastic, which generally occurs in other transformations, for example in injection moulding. Indeed, the plastic does not undergo malaxation or compaction as in an extruder or in injection moulding. Rotational moulding is particularly suitable for preparing large-sized articles, such as furniture, tanks, drums, reservoirs etc.

The most commonly used polymer in rotational moulding is polyethylene, but other polymers such as vinyl polychlorides (PVC), polyamides, polycarbonates and polypropylenes can also be used. However, these polymers typically tend to deform and shrink somewhat within the mould, causing a considerable withdrawal from the mould and non-uniform wall thicknesses. Moreover, these polymers, used alone, are characterized either by slow coalescence, or by a raised melting point, which increases the duration of the production cycle. Polyesters, on the other hand, often lack in good thermal and mechanical properties. Thus, monolayered rotomoulded articles of polyester are not optimal. These can be reinforced by preparing multilayered articles, for example having an additional foamed layer.

However, certain applications may require further improvements of the mechanical and/or thermal properties of the rotomoulded articles, preferably while keeping the weight of the articles low. There thus exists a need to produce articles by rotational moulding, with minimal shrinkage and warpage and improved mechanical and/or thermal properties.

Therefore, an object of this invention is to provide rotationally moulded (rotomoulded) articles comprising a polyester and having improved mechanical and/or thermal properties.

Another object of this invention is to provide rotomoulded articles with good mechanical properties, in particular improved impact strength. Another object of this invention is to provide rotomoulded articles with good mechanical properties, in particular stiffness.

Another object of this invention is to provide rotationally moulded multilayered articles having good adherence between the layers. Another object of this invention is to provide rotomoulded articles having a uniform wall thickness. Another object of this invention is to provide rotomoulded articles presenting a good aspect of internal and external surfaces, without any bubbles, ripples, or other defects. Another object of this invention is to provide rotomoulded articles with an easily paintable surface.

At least one of the objects mentioned above is carried out with the present invention.

SUMMARY OF THE INVENTION

The applicant found in a surprising way that by providing a rotomoulded article comprising at least one first layer comprising fibers embedded in a polymer resin, and at least one second layer comprising a polyester, for example poly (lactic acid), the disadvantages mentioned above may be overcome.

According to a first aspect of the present invention a rotomoulded article is provided. The rotomoulded article comprises:
(i) at least one layer A comprising fibers embedded in a polymer resin; and
(ii) at least one layer B comprising:
from 40 to 100 wt % of an aliphatic polyester,
from 0 to 60 wt % of a polyolefin,
from 0 to 20 wt % of a co- or ter-polymer comprising
a) 50 to 99.9 wt % of ethylene or styrene monomer,
b) 0.1 to 50 wt % of an unsaturated anhydride-, epoxide- or carboxylic acid-containing monomer,
c) 0 to 50 wt % of a (meth)acrylic ester monomer.

According to a second aspect, the present invention also encompasses a method for preparing a rotomoulded article according to the first aspect of the invention, comprising the steps of
(i) applying to at least a part of the interior wall of a mould at least one layer A comprising fibers embedded in a polymer resin;
(ii) adding to the mould the composition for layer B;
(iii) rotating and heating the mould;
(iv) optionally, further adding to the mould the composition for layer C, optionally further adding to the mould the composition for layer D.

DETAILED DESCRIPTION OF THE INVENTION

Figure 1A:
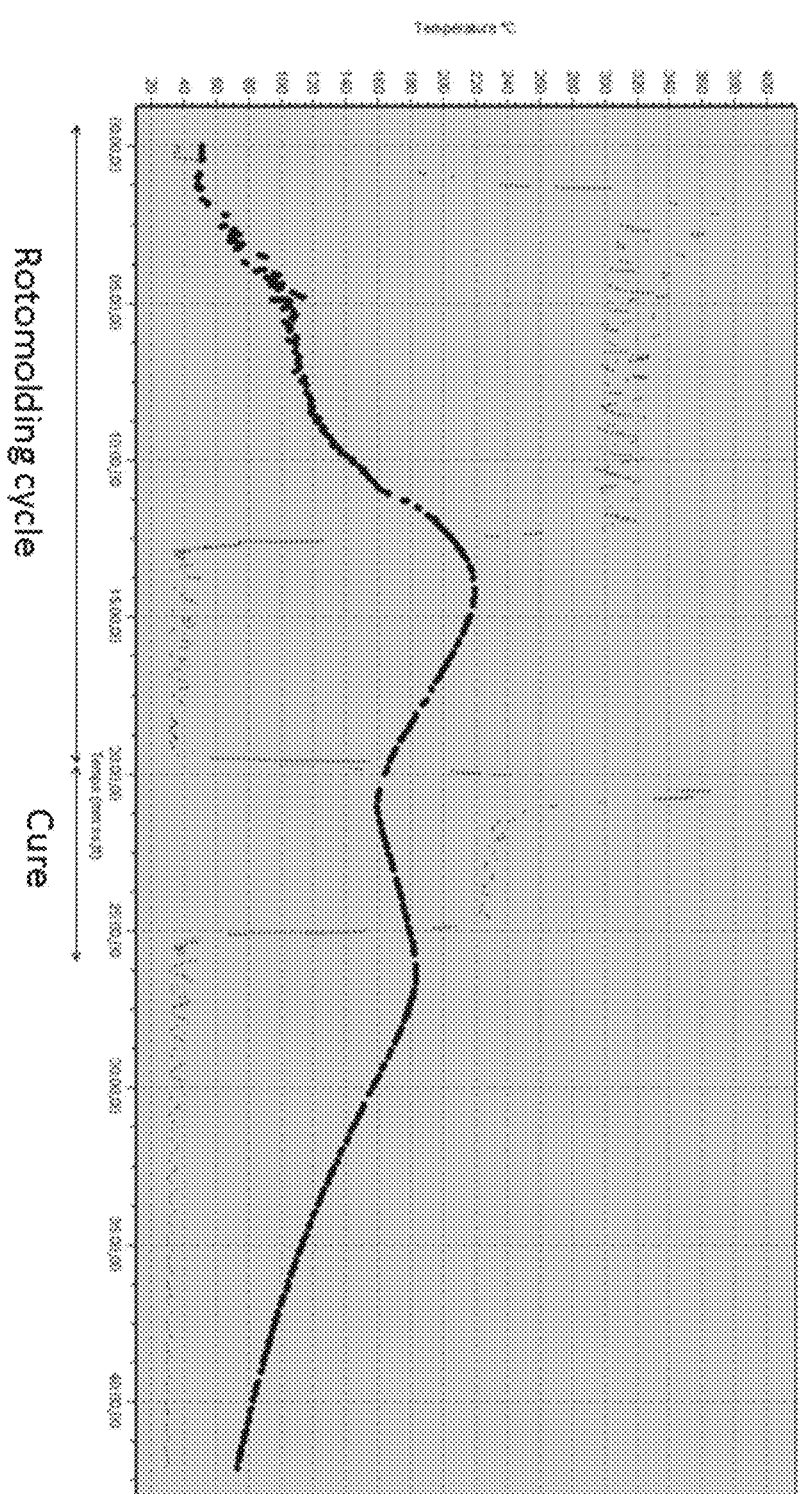
FIGS. 1A, 1B, 1C, 1D, 1E, and 1F: each represent a graph showing the temperature cycle of a rotomoulding process to prepare rotomoulded articles.

The present invention relates to a rotomoulded article. The rotomoulded article comprises:
(i) at least one layer A comprising fibers embedded in a polymer resin; and
(ii) at least one layer B comprising:
from 40 to 100 wt % of an aliphatic polyester, preferably wherein said aliphatic polyester is selected from poly(lactic acid), polyhydroxyalkanoate, polycaprolactone, copolyesters and polyesteramides,
from 0 to 60 wt % of a polyolefin,
from 0 to 20 wt % of a co- or ter-polymer comprising
(a) 50 to 99.9 wt % of ethylene or styrene monomer,
(b) 0.1 to 50 wt % of an unsaturated anhydride-, epoxide- or carboxylic acid-containing monomer,
(c) 0 to 50 wt % of a (meth)acrylic ester monomer.

1. Layer A

The rotomoulded article described herein comprises at least one layer A, comprising fibers embedded in a polymer resin. The layer(s) A may provide improved mechanical properties to the rotomoulded article, such as an improved impact strength. Typically, at least one layer A will form the outer layer of the rotomoulded article. Preferably, layer A is a prepreg comprising a matrix resin and fibers embedded within at least a portion of the matrix resin, also know as "polymer matrix composite material". The term "prepreg" as used herein has its ordinary meaning as known to those skilled in the art and thus includes sheets or lamina of fibers that have been impregnated with a resin within at least a portion of their volume. The resin may be present in a partially cured or uncured state.

The thickness of each layer A typically ranges between 0.1 mm and 10 mm.

Each layer A may cover the underlying layer completely or partially. Thus, in certain embodiments, some parts of the surface of the rotomoulded article may be constituted by one or more layers A, whereas other parts of the surface may be constituted by another layer, such as layer B.

The rotomoulded article may comprise a single layer A, or two or more layers A. The type of fibers and/or resin in two (adjacent) layers A may be identical. However, it is envisaged that two or more layers A may comprise different types of fibers and/or resins. In certain embodiments, the article may comprise a first layer A comprising carbon fibers, and a second layer A comprising glass fibers (fiberglass).

Each layer A comprises fibers embedded in a polymer resin.

1.1. Fibers

The term "fiber" as used herein has its ordinary meaning as known to those skilled in the art and may include one or more fibrous materials adapted for the preparation of layer A. Fibers may take the form of any of continuous fibers, short fibers, flakes, whiskers, sheets, plies, powders, wires, microspheres, nanospheres; and combinations thereof.

In some embodiments, the fibers may further adopt any of unidirectional, multi-dimensional (e.g. two- or three-dimensional), non-woven, woven, knitted, stitched, wound, and braided configurations, as well as swirl mat, felt mat, and chopped mat structures. In some embodiments, the fibers can be provided as fabrics that can have a plain, twill, harness satin, or crow-foot satin weave.

Woven fiber structures may comprise a plurality of woven tows having up to about 1000 filaments, up to about 3000 filaments, up to about 6000 filaments, up to about 12000 filaments, up to about 24000 filaments, up to about 48000 Filaments, up to about 56000 filaments, up to about 125000 filaments, or greater than about 125000 filaments. In further embodiments, the tows may be held in position by cross-tow stitches, weft-insertion knitting stitches, or a small amount of resin, such as a sizing.

In certain embodiments, the fibers form a non-woven fabric. The term "non-woven" as used herein has its ordinary meaning as known to those skilled in the art and may include a fibrous, self-bonding web that is not woven. In particular embodiments, "nonwoven" refers to any material which has been formed without the use of textile weaving processes that produces a structure of individual fibers that are interwoven in an identifiable manner. The nonwoven fabric can be made from short or long fibers. Nonwoven materials may include wet-laid, dry-laid (carded, airlaid), spunmelt (spunlaid, meltblown), flash spun, electrostatic spun, water-jet-punched, and needle punched structures.

The composition of the fibers may be varied as necessary. Suitable fibers include, but are not limited to, fibers comprising materials such as carbon (e.g. graphite), aramid, glass, poly(lactic acid) (PLA), polyolefin such as polypropylene (PP) and polyethylene (PE), PLA stereocomplexes, poly(lactic acid)-poly(butylene adipate-co-terephthalate) (PLA-PBAT), quartz, polyester, poly-p-phenylene-benzobisoxazole (PBO), boron, silicon carbide, polyamide, silicon nitride, aluminum oxide, and combinations thereof. Conductive fibers can also be used. Metals and their alloys may be employed as preferable conductive constituents in view of their relatively high electrical conductivity. Examples of metals and alloys may include, but are not limited to, silver, gold, nickel, copper, aluminum, and alloys and mixtures thereof. In certain embodiments, the morphology of the conductive metal additives may include one or more of fibers, flakes, powders, wires, microspheres, and nanospheres, singly or in combination.

Representative polymers for nonwoven include polyolefins such as low, medium and high density polypropylene, low, medium and high density polyethylene, atactic, sindiotactic or isotactic polypropylene and blends thereof, polyethylene vinyl alcohol and blends thereof, poybutylene as poly(I-butene), and poly(2-butene), poly(3-methyl-1-butene), poly(I-butene), and poly(2-butene), poly(4-methyl-1-pentene), poly(I-hexene), poly(I-heptene), poly(I-octene), poly(I-nonene), poly(I-decene), polyolefinic copolymers and polyolefinic thermoplastic elastomers and blends thereof; polyesters such as polyethyleneterephthalate (PET) and polybuthyleneterephthlatate (PBT), polyether ester copolymers; polyamides such as nylon 6 or nylon 66, polyamide polyether copolymers; polyurethanes and polyether and ester based polyurethane thermoplastic elastomers; polystyrene block copolymers containing polybutadiene, polyisoprene, hydrogenated polybutadiene, hydrogenated polyisoprene or a combination thereof; vinyl polymers and copolymers such as polyvinylchloride, polyvinylidene chloride, polyvinylalcohol and polyethylenevinylacetate, acrylic polymers and copolymers, polycarbonates, polytetrafluoroethylene, and other polymers, and blends thereof.

In some preferred embodiment, suitable fibers are selected from the group comprising carbon fibers, aramid fibers (such as Kevlar® fibers), glass fibers, poly(lactic acid) (PLA) fibers, polypropylene (PP) fibers, PLA stereocomplex fibers, poly(lactic acid)-poly(butylene adipate-co-terephthalate) (PLA-PBAT) fibers, quartz fibers (such as Astroquartz®), polyethylene fibers, polyester fibers, graphite fibers, poly-p-phenylene-benzobisoxazole (PBO) fibers, boron fibers, silicon carbide fibers (such as Tyranno® fibers or Nicalon® fibers), polyamide fibers (such as Nylon® fibers), silicon nitride fibers, aluminum oxide fibers (such as Nextel® fibers), metal fibers, and combinations thereof. In some more preferred embodiments, the fibers are selected from the group comprising carbon fibers, fiberglass, and aramid fibers, or blends thereof.

1.2. Resin

In layer A, the fibers are embedded in a polymer resin. In the context of this application, "resin" encompasses one or more compounds and/or compositions comprising thermoset and/or thermoplastic materials. Examples of suitable polymer resin may include, but are not limited to, epoxy resins, epoxy curing agents, polyurethanes, phenolics, phenols, cyanate esters, polyimides (e.g., bismaleimide (BMI) and polyetherimides), polyesters, benzoxazines, polybenzoxazines, polybenzoxazones, polybenzimidazoles, polybenzothiazoles, polyamides, polyamidimides, polysulphones, polyether sulphones, polycarbonates, polyethylene terephthalates, cyanates, cyanate esters, and polyether ketones (e.g. polyether ketone (PEK), polyether ether ketone (PEEK), polyether ketone ketone (PEKK) and the like), combinations thereof, and precursors thereof, In preferred embodiments, the polymer resin is an epoxy resin. Suitable epoxy resins may include polyepoxides having at least two epoxide functional groups per molecule. The polyepoxides may be saturated, unsaturated, cyclic, or acyclic, aliphatic, alicyclic, aromatic, or heterocyclic. Examples of suitable polyepoxides include the polyglycidyl ethers, which are prepared by reaction of epichlorohydrin or epibromohydrin with a polyphenol in the presence of alkali. Suitable polyphenols therefore are, for example, bisphenol A (bis(4-hydroxyphenyl)-2,2-propane), resorcinol, pyrocatechol, hydroquinone, bisphenol F (bis(4-hydroxyphenyl) methane), bis(4-hydroxyphenyl)-1,1-isobutane, 4,4'-dihydroxybenzophenone, bis(4-hydroxyphenyl)-1,1-ethane, and 1,5-hydroxynaphthalene. Other suitable polyphenols as the basis for the polyglycidyl ethers are the known condensation products of phenol and formaldehyde or acetaldehyde of the Novolac resin-type.

Additionally or alternatively, the epoxy resin may comprise other polyepoxides such as polyglycidyl ethers of polyalcohols or diamines. Such polyglycidyl ethers are typically derived from polyalcohols, such as ethylene glycol, diethylene glycol, triethylene glycol, 1,2-propylene glycol, 1,4-butylene glycol, triethylene glycol, 1,5-pentanediol, 1,6-hexanediol or trimethylolpropane.

Additionally or alternatively, the epoxy resin may comprise polyglycidyl esters of polycarboxylic acids, for example, reaction products of glycidol or epichlorohydrin with aliphatic or aromatic polycarboxylic acids, such as oxalic acid, succinic acid, glutaric acid, terephthalic acid or a dimeric fatty acid. Other epoxies may include those derived from the epoxidation products of olefinically-unsaturated cycloaliphatic compounds or from natural oils and fats. Other epoxies may include liquid epoxy resins derived by reaction of bisphenol A or bisphenol F and epichlorohydrin.

The epoxy resin may include further constituents including, but not limited to, thermoplastic or thermosetting polymers, additives, fillers, stabilizers, curing agents and/or catalysts.

Suitable commercially available epoxy resins include, but are not limited to, the resin sold under the names HexPly® M77, Cycom® 977-2, or HexPly® M21.

Preferably, the polymer resin of the at least one layer A has a glass transition temperature (Tg) of at least 60° C. In further embodiments, the polymer resin has a Tg of at least 70° C., for example the polymer resin has a Tg of at least 80° C., for example a Tg of at least 90° C., for example of at least 100° C., for example of at least 120° C., for example of at least 140° C., for example of at least 160° C., for example of at least 180° C., for example of at least 200° C., or higher. The glass transition temperature of the epoxy resin may be determined using Differential Scanning calorimetry (DSC), for example according to the ISO 11357-2:1999 standard; Rheometrics Dynamic Spectrometer (RDS), or dynamic mechanical thermal analysis (DMTA). In a preferred embodiment, the glass transition temperature of the epoxy resin is determined using DSC, and is of at least 60° C.

Preferred resins have a fracture toughness $G_O$ higher than 0.200 kJ/m$^2$ where $G_O$ is the critical strain energy release rate in creating new crack area.

Non-limiting examples of suitable resin systems include Cycom 977-2 manufactured by Cytec Industries Inc.

1.3. Layer A

In some embodiments, layer A can comprise from 30 to 80% fiber volume %, for example from 40 to 70% fiber volume, based on the total volume of layer A. In some embodiments, layer A can comprise from 20 to 70 volume % of the polymer resin, based on the total volume of layer A. In particular embodiments, layer A comprises from 50 to 60 volume % of fibers, and from 40 to 50 volume % of the resin.

In a preferred embodiment, layer A comprises fibers embedded in a polymer resin comprising an epoxy resin; preferably a curing toughened epoxy resin. In some preferred embodiments, the fibers are selected from the group comprising carbon fibers, fiberglass, and aramid fibers, or blends thereof.

The present inventors have found that layer A comprising fibers embedded in epoxy resin adhere particularly well to adjacent layers B. Without wishing to be bound by theory, it is believed that during the curing of the article, the epoxy resin in layer A reacts with carboxyl and/or hydroxyl groups of the polyester of layer B. Furthermore, (cured) epoxy resins typically provide excellent mechanical and chemical characteristics to layer A including high heat resistance, high hardness, high dimension stability and high chemical resistance, and a barrier to humidity.

Various composite materials comprising fibers embedded in a polymer resin are commercially available, typically as prepregs. Suitable examples of commercially available prepregs comprising carbon fibers and epoxy resins include, but are not limited to prepreg fabrics and tapes sold under the name HexPly® 8552, or Toray® T800/3900-2.

In preferred embodiments, layer A has a Tg of at least 60° C. as determined by Differential Scanning calorimetry. In further embodiments, layer A has a Tg of at least 70° C., for example at least 75° C., for example at least 80° C., for example at least 90° C., for example of at least 100° C., for example of at least 120° C., for example of at least 140° C., for example of at least 160° C., for example of at least 180° C., for example of at least 200° C., or higher. The term "glass transition temperature" as used herein refers to the temperature at which a polymer is transformed, in a reversible way, from a viscous or rubbery condition to a hard and relatively brittle one. The glass transition temperature may be determined via Differential Scanning calorimetry (DSC), for example according to the ISO 11357-2:1999 standard, for example the TG can be determined using DSC at a temperature ranging from 25° C. to 300° C. at 10° C./min under $N_2$ inert atmosphere.

In some embodiment, the tensile modulus of layer A was at least 10 GPa. The tensile modulus can be measured according to ISO-527.

2. Layer B

In addition to the layer(s) A, the rotomoulded article of the invention further comprises at least one layer B, wherein layer B comprises:

from 40 to 100 wt % of a polyester, preferably wherein said polyester is an aliphatic polyester, preferably selected from poly(lactic acid), polyhydroxyalkanoate, polycaprolactone, copolyesters and polyesteramides; more preferably wherein said polyester is an aliphatic polyester selected from poly(lactic acid), polyhydroxyalkanoate, polycaprolactone, and polyesteramides; more preferably wherein said polyester is an aliphatic polyester selected from poly(lactic acid), polycaprolactone, and polyesteramides; yet more preferably wherein said aliphatic polyester is poly(lactic acid);

from 0 to 50 wt % of a polyolefin, from 0 to 20 wt % of a co- or ter-polymer comprising:
  a) 50 to 99.9 wt % of an ethylene or a styrene monomer,
  b) 0.1 to 50 wt % of an unsaturated anhydride-, epoxide- or carboxylic acid-containing monomer,
  c) 0 to 50 wt %, preferably 0.1 to 30 wt %, (meth) acrylic ester monomer.

In some embodiments, each layer B has an average thickness of at least 100 µm, for example from 100 µm to 30 mm.

2.1. Polyester (e.g. PLA)

Preferably, the polyester is an aliphatic polyester, although any polyester known in the art can be used. The advantage of using an aliphatic polyester is that it is prepared from natural renewable resources. The aliphatic polyester is preferably selected from poly(lactic acid) (PLA), polyhydroxyalkanoate (PHA), polycaprolactone (PCL), copolyesters and polyesteramides.

A non-limiting example of a suitable copolyester includes Tritan™ copolyester from Eastman: a copolyester based on the use of 2,2,4,4-tetramethyl-1,3-cyclobutanediol (TMCD) as a comonomer.

The polyester, for example PLA, is preferably present in an amount ranging from at least 40 wt %, for example at least 50 wt %, for example at least 60 wt %, for example at least 65 wt %, for example at least 70 wt %, for example at least 75 wt %, for example at least 80 wt %, for example at least 90 wt %, for example at least 95 wt %, for example at least 96 wt %, for example at least 97 wt %, for example at least 98 wt %, for example at least 99 wt %, for example at least 99.4 wt %, for example at least 99.5 wt % up to 100 wt % by weight of layer B. In particular embodiments, the polyester, for example PLA, is present in an amount ranging from 50 to 100 wt % of layer B, for example the polyester is present in an amount ranging from 60 to 100 wt % of layer B, for example, the polyester is present in an amount ranging from 70 to 100 wt % of layer B, more preferably 75 to 100 wt %. In certain embodiments, the polyester, for example PLA, is present in an amount ranging from 70 to 100 wt % of layer B, more preferably from 90 to 100 wt % by weight of layer B. Most preferably, the polyester is PLA.

The PLA (also known as polylactide) is preferably a thermoplastic resin derived from renewable resources.

Suitable PLA also includes copolymers of lactic acid. For instance, copolymers of lactic acid and trimethylene carbonate according to EP application number 11167138 and copolymers of lactic acid and urethanes according to WO 2008/037772 and PCT application number PCT/EP2011/057988. In some embodiments, the introduction of comonomers to PLA increases the ductility (i.e. decreases the brittleness) of the PLA.

Preferably, the PLA used in the rotomoulded article of the invention can be a poly-L-lactide (PLLA), a poly-D-lactide (PDLA) and/or a mixture of PLLA and PDLA. By PLLA, it is meant a polymer in which the majority of the repetitive units are monomers of L-lactide and by PDLA, a polymer in which the majority of the repetitive units are D-lactide monomers. Stereocomplexes of PLLA and PDLA, as described for example in WO 2010/097463, can also be used. Preferably, the polylactide used is the PLLA.

Preferably, the PLLA or the PDLA respectively have an optical purity (called isomeric purity) of the L or D isomer, which is higher than 92 wt % of the PLA, preferably higher than 95 wt %. An optical purity from at least 99 wt % is more preferred.

The PLLA used in the invention thus includes a content of D isomer lower than 8 wt %, preferably lower than 5 wt %, more preferably lower or equal to 1 wt % of the PLLA. By analogy, the PDLA includes a content of L isomer lower than 8 wt %, preferably lower than 5 wt %, more preferably lower or equal to 1 wt % of the PDLA.

PLA (PLLA or PDLA) preferably has a weight average molecular weight (Mw) ranging between 30.000 and 500.000 g/mol, more preferably between 50.000 and 400.000 g/mol, even more preferably between 50.000 and 300.000 g/mol. The weight average molecular weight is measured by chromatography by gel permeation compared to polystyrene standards in chloroform at 30° C. The ratio of the weight average molecular weight (Mw) to the Mn is generally between 1.0 and 5.0.

The process for preparing PLA is well-known by the person skilled in the art. For example PLA can be obtained by the process describes in documents WO1998/002480, WO 2010/081887, FR2843390, U.S. Pat. No. 5,053,522, U.S. Pat. No. 5,053,485 or U.S. Pat. No. 5,117,008.

In an embodiment, the PLA is obtained by polymerizing lactide, in the presence of a suitable catalyst and preferably in the presence of a compound of formula (I), acting as a co-initiator and transfer agent of the polymerization,

$$R^1\text{—OH} \tag{I}$$

wherein $R^1$ is selected from the group comprising $C_{1-20}$alkyl, $C_{6-30}$aryl, and $C_{6-30}$aryl$C_{1-20}$alkyl optionally substituted by one or more substituents selected from the group comprising halogen, hydroxyl, and $C_{1-6}$alkyl. Preferably, $R^1$ is selected from $C_{3-12}$alkyl, $C_{6-10}$aryl, and $C_{6-10}$aryl$C_{3-12}$alkyl, optionally substituted by one or more substituents, each independently selected from the group comprising halogen, hydroxyl, and $C_{1-6}$alkyl; preferably, $R^1$ is selected from $C_{3-12}$alkyl, $C_{6-10}$aryl, and $C_{6-10}$ aryl$C_{3-12}$ alkyl, optionally substituted by one or more substituents, each independently selected from the group comprising halogen, hydroxyl and $C_{1-4}$alkyl. The alcohol can be a polyol such as diol, triol or higher functionality polyhydric alcohol. The alcohol may be derived from biomass such as for instance glycerol or propanediol or any other sugar-based alcohol such as for example erythritol. The alcohol can be used alone or in combination with another alcohol.

In an embodiment, non-limiting examples of initiators include 1-octanol, isopropanol, propanediol, trimethylolpropane, 2-butanol, 3-buten-2-ol, 1,3-butanediol, 1,4-butanediol, 1,6-hexanediol, 1,7-heptanediol, benzyl alcohol, 4-bromophenol, 1,4-benzenedimethanol, and (4-trifluoromethyl) benzyl alcohol; preferably, said compound of formula (I) is selected from 1-octanol, isopropanol, and 1,4-butanediol.

The PLA structure can be of the following types in terms of chain termination:

R—OH and R—COOH, with R being the PLA chain, obtainable when using monoalcohol as co-initiator, HO—R—OH and HOOC—R—COOH obtainable when using diol as co-initiator, or multiple OH (e.g. 5), obtainable when using triol or higher functionality polyhydric alcohol as co-initiator, Preferably, the PLA used in layer B has R—OH and R—COOH, chain termination, and was obtained using a monoalcohol as co-initiator.

Preferably, the PLA used in layer B has a crystallinity index (CI), as measured by XRD, of at least 5%. Preferably the crystallinity index of the PLA is at most 60%.

In some embodiment, the PLA for use in the invention is in the form of particles with an average particle size between 20 μm and 2000 μm, for example between 50 and 1000 μm is preferred and preferably is the average particle size of between 100 and 800 μm. In the present invention, by particles one understands "grains", which can be spherical, and/or ovoid forms, or can be of any other shapes or forms. The size corresponds to the longest dimension of these particles. In the case of spherical particles, the size corresponds to the diameter of these particles. The particles of PLA can be obtained by extrusion of the PLA exiting the polymerization reactor through a die with die gaps having corresponding dimensions. The PLA for use in the invention can be in the form of micropellets or powders. The particles of PLA can be also obtained by grinding/milling pellets of PLA whose dimension is higher than 2000 μm, for example pellets whose dimension lies between 4000 μm and 5000 μm. Such pellets of PLA can be obtained after polymerization per extrusion while passing the PLA through a die whose openings have corresponding dimension. In this case, the grinding of PLA pellets can be carried out by various types of grinders, such as for example a grinder with a disc, a mill, or an electromagnetic grinder, for example with a piston. Grinding can be done at room temperature or cryogenically, i.e. carried out at a temperature ranging between −10 and −200° C., preferentially between −20 and −100° C. Cryogenic grinding allows in particular to avoid yellowing of the articles obtained and to obtain a highly grinded powder flow. Cryogenic grinding also makes it possible to produce a powder without filaments, this being particularly adapted to the rotomoulding application. Grinding can be carried out under inert atmosphere, i.e. in the absence of oxygen; for example under nitrogen.

After grinding, it is possible to measure and/or modify the granulometry of the PLA by using rotating sieves. To determine the granulometry of the PLA one can use a method of sieving, for example, by using sieves of different mesh sizes, or with a laser i.e. a Malvern Mastersizer.

In the present invention, one defines the PLA whose average particle size lies between 20 μm and 2000 μm which was obtained from grinding PLA pellets with initial dimensions greater than 2000 μm "PLA powder". The PLA can be either in the form of powder, or in the form of micropellets, or in the form of a mixture of powder and micropellets. The powder or micropellets of PLA can be used as they are without the addition of other compounds or they can be mixed with various compounds, loads, agents and/or additives.

Many methods of mixing PLA with such additives can be used: mixing the additives with PLA in the melt or adding the additives directly to the mould with the PLA powder or micropellets. They can also be mixed with the powder after grinding or with the micropellets before introduction into the rotational mould. They can also be introduced into the PLA still in the molten state obtained directly after polymerization. Some of these additives can even be added during the polymerization of the PLA. One can also consider the addition of these additives to PLA pellets having a dimension higher than 2.000 μm before grinding. The powder and micropellets of PLA can thus include antioxidants, and light and heat stabilizers, as well as anti-UV agents such as 2-(2-Hydroxy-5-tert-octylphenyl)benzotriazole commercially available under the name CYASORB® UV-5411 Light Absorber from Cytec.

For example, suitable antioxidants include compounds containing phenol functional groups. One can use antioxidants called "primaries" such as compounds 1,3,5-TRIS(4-tert-butyl-3-hydroxy-2,6-dimethylbenzyl)-1,3,5-triazine-2,4,6-(1H,3H,5H)-trione, commercially available under the name Cyanox® 1790 from Cytec. One can also use antioxidants called "secondaries" such as compounds containing phosphite functional groups such as Ultranox® 626 from Chemtura, or Irgafos® 168 from BASF.

When one of these additives is present, its concentration in the PLA preferably lies between 0.05 wt % and 5 wt % compared.

Fillers, impact resistance modifiers and other additives can also be included.

Fillers are preferentially selected from the group of fibrous compositions such as glass fibers, metal fibers, carbon fibers, minerals such as clays, kaolin, or nanoparticles such as carbon nanotubes, and powders such as talc.

Other additives which can be used include but are not limited to, for example, fire retardants, lubricants, plasticizers, anti-static agents, pigments, dyes, surfactants. Among plasticizers, one can in particular select those of the family of citrates, in particular citrate esters like citrate of terbutylene (TBC) or butyrate esters like tri-ethylene glycol di 2-ethyl hexylbutyrate or their mixtures. Preferably, TBC is used.

The polyester, in particular PLA, can then be blended either in dry form or in the melt with the polyolefin, to create the composition required for layer B.

In another embodiment of layer B, the PLA pellets, optional polyolefin and optional co- or ter-polymer are compounded together according to any known compounding method in the art, e.g. mixer, like a Banbury mixer, or an extruder, preferably a twin screw extruder. The extrusion is generally carried out at a temperature below 230° C.

2.2. Optional Polyolefin of Layer B (e.g. Polyethylene)

The polyolefin is optionally present preferably in an amount ranging from 0.0 wt % based on the total weight of layer B up to 60 wt %, for example from at least 0.0.1 wt % based on the total weight of layer B, for example at least 0.5 wt %, for example at least 1 wt %, for example at least 2 wt %, for example at least 5 wt %, for example at least 10 wt %, for example at least 15 wt %, for example at least 20 wt % of layer B, for example at least 25 wt %, for example at least 30 wt %, for example at least 35 wt %, for example at least 40 wt %, for example at least 45 wt %, for example at least 50 wt %, for example at least 55 wt %, up to 60 wt % of layer B. In certain embodiments, the polyolefin is present in an amount ranging from 0.1 to 50 wt % of layer B, more particularly from 0.1 to 25 wt % of layer B, most particularly from 1 to 20 wt % of layer B. However, it is also envisaged that in certain embodiments, layer B does not comprise a polyolefin.

The polyolefin can be selected from polyethylene, polypropylene, polybutene or polyhexene.

Preferably, the polyolefin is polyethylene. With polyethylene herein it is meant a polyethylene comprising at least 50 wt % of ethylene monomers. The polyethylene may comprise up to 50 wt % of alpha-olefin comonomers selected from alpha-olefins having from 3 to 12 carbon atoms. Preferably, the comonomer is selected from propylene, n-butene, iso-butene, n-pentene, iso-pentene, n-butene or iso-butene.

The polyethylene can be prepared with a chromium, Ziegler-Natta catalyst or a single-site catalyst, such as a metallocene, according to any known polymerization process in the art.

Preferably, the polyethylene is prepared with a single-site catalyst, in particular with a metallocene catalyst. This induces a narrow molecular weight distribution, regular comonomer insertion, and uniform comonomer distribution. This means such a polyethylene preferably has a narrow molecular weight distribution of from 1 to 5 (measured by GPC) and a narrow comonomer distribution index (CDBI) i.e. at least 50%, preferably at least 60%, more preferably at least 75%, measured by TREF (temperature rising elusion fractionation). Any metallocene known in the art can be used to prepare the polyethylene. In one embodiment, the metallocene can be an unbridged metallocene, for example, selected from the group comprising bis(iso-butylcyclopentadienyl) zirconium dichloride, bis(pentamethylcyclopentadienyl) zirconium dichloride, bis(tetrahydroindenyl) zirconium dichloride, bis(indenyl) zirconium dichloride, bis(1,3-dimethylcyclopentadienyl) zirconium dichloride, bis (methylcyclopentadienyl) zirconium dichloride, bis(n-butylcyclopentadienyl) zirconium dichloride, and bis (cyclopentadienyl) zirconium dichloride; and preferably selected from the group comprising bis(cyclopentadienyl) zirconium dichloride, bis(tetrahydroindenyl) zirconium dichloride, bis(indenyl) zirconium dichloride, and bis(1-methyl-3-butyl-cyclopentadienyl)zirconium dichloride. In another embodiment, the metallocene can be a bridged metallocene, for example, selected from the group comprising ethylene bis(4,5,6,7-tetrahydro-1-indenyl) zirconium dichloride, ethylene bis(1-indenyl) zirconium dichloride, dimethylsilylene bis(2-methyl-4-phenyl-inden-1-yl) zirconium dichloride, dimethylsilylene bis(2-methyl-1H-cyclopenta[a]naphthalen-3-yl) zirconium dichloride, cyclohexylmethylsilylene bis[4-(4-tert-butylphenyl)-2-methyl-inden-1-yl]zirconium dichloride, dimethylsilylene bis[4-(4-tert-butylphenyl)-2-(cyclohexylmethyl)inden-1-yl]zirconium dichloride. Bridged bis(tetrahydroindenyl) metallocenes are preferred, in particular ethylene bis(4,5,6,7-tetrahydro-1-indenyl) zirconium dichloride.

The polyethylene preferably has a density of at least 0.900 g/cm$^3$, more preferably at least 0.910 g/cm$^3$, even more preferably of at least 0.920 g/cm$^3$ and most preferably of at least 0.930 g/cm$^3$. It is of at most 0.965 g/cm$^3$, preferably of at most 0.960 g/cm$^3$. Most preferably, the polyethylene has a density of 0.932 to 0.945 g/cm$^3$. The density is measured following the method of standard test ISO 1183 at 23° C.

The polyethylene preferably has a melt index MI2 of at least 1 dg/min, preferably of at least 1.5 dg/min, more preferably of at least 2 dg/min. It is preferably at most 25 dg/min, more preferably at most 20 dg/min. Most preferably, the polyethylene has an MI2 of 1 dg/min to 10 dg/min. The melt flow index MI2 is measured following the method of standard test ISO 1133 condition D at a temperature of 190° C. and a load of 2.16 kg.

Most preferably the polyethylene is prepared with an ethylene bis(4,5,6,7-tetrahydro-1-indenyl) zirconium dichloride metallocene, wherein the polyethylene has a density of 0.930 to 0.950 g/cm$^3$ and a melt index MI2 of 1 to 10 dg/min.

The polyolefin of layer B may contain additives, in particular additives suitable for rotational moulding, such as, by way of example, processing aids, mould-release agents, anti-slip agents, primary and secondary antioxidants, light stabilizers, anti-UV agents, acid scavengers, flame retardants, fillers, nanocomposites, lubricants, antistatic additives, nucleating/clarifying agents, antibacterial agents, plasticizers, colorants/pigments/dyes and mixtures thereof. Preferably the polyolefin comprises an anti-UV agent. Illustrative pigments or colorants include titanium dioxide, carbon black, cobalt aluminum oxides such as cobalt blue, and chromium oxides such as chromium oxide green. Pigments such as ultramarine blue, phthalocyanine blue and iron oxide red are also suitable. Specific examples of additives include lubricants and mould-release agents such as calcium stearate, zinc stearate, SHT, antioxidants such as Irgafos 168™, Irganox 1010™, and Irganox 1076™, anti-slip agents such as erucamide, light stabilizers such as Cyasorb THT 4611 and 4802, tinuvin 622™ and tinuvin 326™, and nucleating agents such as Milliken HPN20E™, or Milliken Hyperform® HPR-803i.

An overview of the additives that can be used in the injection-moulded articles of the present invention may be found in Plastics Additives Handbook, ed. H. Zweifel, 5th edition, 2001, Hanser Publishers.

In a preferred embodiment of layer B, the PLA pellets, optional polyolefin and optional co- or ter-polymer are compounded together according to any known compounding method in the art, e.g. mixer, like a Banbury mixer, or an extruder, like a twin screw extruder. The extrusion is generally carried out at a temperature below 230° C.

2.3. Optional Co- or Ter-Polymer (Compatibilising Agent)

The optional co- or ter-polymer comprises ethylene or styrene monomer, an unsaturated anhydride-, epoxide- or carboxylic acid-containing monomer and optionally a (meth)acrylic ester monomer. When present, the co- or ter-polymer acts as a compatibilizer between the polar polyester and any polyolefin. It also acts as a chain modifier.

If present the co- or ter-polymer is preferably present from 0.1 to 20 wt %, more preferably from 0.1 to 15 wt %, even more preferably from 0.5 to 10 wt %, most preferably from 1 to 5 wt % of layer B.

Preferably, the optional co- or ter-polymer comprises:
a) 50 to 99.9 wt % of ethylene or styrene monomer, preferably 50 to 99.8 wt %,
b) 0.1 to 50 wt % of an unsaturated anhydride-, epoxide- or carboxylic acid-containing monomer,
c) 0 to 50 wt % of a (meth)acrylic ester monomer,
the total sum of components being 100 wt %.

In the embodiment of the co-polymer, it comprises preferably:
a) 50 to 99.9 wt % of ethylene or styrene monomer, preferably 50 to 99 wt %,
b) 0.1 to 50 wt % of an unsaturated anhydride-, epoxide- or carboxylic acid-containing monomer, preferably 1 to 50 wt %,
the total sum of components being 100 wt %.

In the embodiment of the ter-polymer, it comprises preferably:
a) 50 to 99.8 wt % of ethylene or styrene monomer,
b) 0.1 to 50 wt % of an unsaturated anhydride-, epoxide- or carboxylic acid-containing monomer,
c) 0.1 to 50 wt % of a (meth)acrylic ester monomer,
the total sum of components being 100 wt %.

In all embodiments of the co- or ter-polymer, the ethylene or styrene monomer (a) is present from 50 to 99.9 wt %, preferably from 50 to 99.8 wt %, more preferably from 60 to 99.5 wt %, even more preferably from 65 to 99 wt %, most preferably from 70 to 98 wt %. In the embodiment of the copolymer, the ethylene or styrene monomer can be present from 90 to 98 wt %.

In all embodiments of the co- or ter-polymer, the unsaturated monomer (b) is preferably selected from an unsaturated anhydride- or epoxide-containing monomer. More preferably, the unsaturated monomer (b) is selected from a glycidyl (meth)acrylate or maleic anhydride. The unsaturated monomer (b) is preferably present from 0.1 to 40 wt %, more preferably from 0.2 to 30 wt %, even more preferably from 0.3 to 20 wt %, yet even more preferably from 0.3 to 15 wt % and most preferably from 0.3 to 10 wt % of the co- or ter-polymer.

The (meth)acrylic ester monomer (c), if present, is preferably selected from those acrylates which have between 1 and 10 carbon atoms such as for example methyl (meth)acrylate, ethyl (meth)acrylate, n-butyl (meth)acrylate, iso-butyl (meth)acrylate, 2-ethylhexyl (meth)acrylate, or n-octyl (meth)acrylate. If present, it preferably makes up 0.1 to 50 wt % of the terpolymer, preferably 0.5 to 40 wt %, more preferably 1 to 30 wt %, even more preferably 2 to 25 wt % and most preferably 5 to 25 wt % of the terpolymer.

The copolymers of ethylene or styrene monomer and of a glycidyl (meth)acrylate or maleic anhydride can contain from 50 to 99 wt % of ethylene or styrene monomer and from 1 to 50 wt % of a glycidyl (meth)acrylate or maleic anhydride, preferably from 90 to 98 wt % of ethylene or styrene monomer and from 2 to 10 wt % of a glycidyl (meth)acrylate or maleic anhydride, the total sum of components being 100 wt %.

The terpolymers of ethylene or styrene monomer, of a glycidyl (meth)acrylate or maleic anhydride and of a (meth)acrylic ester monomer can contain from 50 to 98.8 wt % of ethylene or styrene monomer, from 0.2 to 10 wt % of a glycidyl (meth)acrylate or maleic anhydride and from 1 to 50 wt % of a (meth)acrylic ester monomer, the total sum of components being 100% of the terpolymer. Preferably the terpolymer can contain from 55 to 97.7 wt % of ethylene or styrene monomer, from 0.3 to 8% of a glycidyl (meth)acrylate or maleic anhydride, and from 2 to 35% of (meth)acrylic ester monomer, the total sum of components being 100% of the terpolymer.

Still more preferably, the co- or ter-polymer is selected among copolymers of ethylene and glycidyl methacrylate and terpolymers of ethylene or styrene, acrylic ester monomers and glycidyl methacrylate or maleic anhydride. Among those one can use for example the copolymer of ethylene and glycidyl methacrylate sold under the trademark Lotader® AX 8840 by Arkema France, the terpolymer of ethylene, ethylacrylate and maleic anhydride sold under the denomination Lotader® 4700 by Arkema France, as well as the terpolymer of styrene monomer, acrylic esters and glycidyl methacrylate sold under the trademark Joncryl® by BASF.

In the most preferred embodiment, the co- or ter-polymer is selected from a terpolymer of ethylene or styrene monomer, acrylic esters and glycidyl methacrylate. Preferably, the acrylic ester is methylacrylate. An example of such a terpolymer is Lotader® AX8900 sold by Arkema France comprising 68 wt % of ethylene monomer, 8 wt % of glycidylmethacrylate and 24 wt % methyl acrylate.

The co- or terpolymer, is then blended either in dry form or in the melt with the polyolefin, in particular a polyethylene, and the polyester, in particular PLA, to create the composition required for layer B.

The co- or terpolymer and the polyester can be added one by one to the polyolefin and mixed after each addition or they can be added together and mixed together once.

In a preferred embodiment of layer B, the PLA pellets, polyolefin and optional co- or ter-polymer are compounded together according to any known compounding method in the art, e.g. mixer, like a Banbury mixer, or an extruder, preferably a twin screw extruder. The extrusion is generally carried out at a temperature below 230° C.

The composition for layer B can be in powder or micropellet form suitable for rotational moulding.

3. Optional Layer C

In addition to layer A and layer B as described above, the rotomoulded article described herein may comprise one or more further layers C, comprising:

- from 50 to 99.4 wt %, preferably 60 to 99 wt % of a polyolefin, which can be different from the (optional) polyolefin of layer B,
- from 0.5 to 50 wt %, more preferably 1 to 30 wt %, most preferably 5 to 30 wt %, of a polyester (preferably PLA), which can be different from the polyester of layer B,
- from 0.1 to 20 wt %, preferably 0.1 to 15 wt %, of a co- or ter-polymer, which can be different from the co- or ter-polymer of layer B, comprising:
  a) 50 to 99.9 wt % of an ethylene or a styrene monomer,
  b) 0.1 to 50 wt % of an unsaturated anhydride-, epoxide- or carboxylic acid-containing monomer,
  c) 0 to 50 wt % (meth)acrylic ester monomer.

Layer C is preferably adjacent to layer B. More particularly, layer B is preferably adjacent to and positioned between a layer A as described herein and layer C.

In particular embodiments, layer C has an average thickness ranging between 0.5 mm and 10 mm. When foamed, layer C typically has an average thickness ranging between 5 mm to 100 mm.

3.1. Polyolefin of Layer C

The polyolefin can be present from in an amount ranging from 50 wt %, for example from 60 wt %, for example from 70 wt % up to 99.4 wt % based on the total weight of layer C.

The polyolefin can be the same as or different from the polyolefin optionally present in layer B. The polyolefin can be selected from polyethylene, polypropylene, polybutene or polyhexene.

Preferably, the polyolefin is polyethylene. The description of polyethylene present in layer B applies mutatis mutandis to the polyethylene in layer C, which can be the same as or different from any polyethylene present in layer B.

The composition for layer C can be in powder or micropellet form, suitable for rotational moulding. When optional chemical blowing agent is present and micropellets are used, the polyolefin and chemical blowing agent are preferably compounded together instead of dry blended.

3.2. The Polyester and the Co- and Ter-Polymer of Layer C

The description of the polyester (section 2.1 above) and the co- or ter-polymer (section 2.3 above) present in layer B applies mutatis mutandis to layer C. The optional polyester (preferably PLA) and the optional co- or ter-polymer can be the same as or different from those present in layer B. In particular embodiments, layer C comprises from 5 to 30 wt % PLA.

Thus, layer C can be the same as or different from layer B.

3.3. The Optionally Foamed Layer C—Chemical Blowing Agents

Optionally, layer C is a foamed polyolefin layer. In order to foam polyolefin a chemical blowing agent can be included into layer C, which causes the polyolefin to foam under the appropriate conditions in the presence of a blowing gas in the mould during rotational moulding. The chemical blowing step generally fulfils several requirements:

- the decomposition temperature range of the blowing agent is compatible with the processing temperature of the polyolefin;
- the liberation of the blowing gas occurs within a defined temperature range of about 10° C. and is controllable during the process;

the decomposition is not autocatalysed in order to avoid overheating;

the blowing gas is chemically inert, such as preferably nitrogen, carbon dioxide and water;

the chemical blowing agent is homogeneously and easily incorporated in and compatible with polyethylene.

During the foaming process, at elevated temperatures, chemical blowing agents undergo chemical reactions that liberate gas, typically $N_2$, CO, $CO_2$ and $NH_3$ and water.

The chemical agents that can be used can function according to three main processes:

Irreversible reaction: AB-->C+gas. They can be selected from the group comprising azo compounds, hydrazine derivatives, semicarbazides, tetrazoles and nitroso compounds.

Equilibrium reactions: AB<--->C+gas. They can be selected from the group comprising bicarbonates and carbonates.

Combination of compounds that liberate gases as a result of their chemical interactions: A+BG-->AB+gas.

The chemical blowing agents can be:

Exothermic, such as for example azodicarbonamide (AZ) or 4,4'-oxy-bis(benzenesulfonylhydrazide) (OB); or Endothermic, such as for example sodium bicarbonate (SB).

Suitable chemical blowing agents include:

Organic Chemical Blowing Agents:

Azo compounds such as for example azodicarbonamide decompose at a temperature range of from 160 to 215° C. and liberate about 220 ml/g of gas, mostly $N_2$, CO, $CO_2$, $NH_3$ and water.

Hydrazides such as for example or 4,4'-oxy-bis(benzenesulfonylhydrazide) (from example Genitron® OB from LANXESS). It decomposes at a temperature range of from 140 to 160° C. and liberates 120 to 140 ml/g of gas, mostly $N_2$ and $H_2O$. This type of agent is particularly preferred as it is exothermic and releases only neutral gases.

Other examples include modified azodicarbonamide, i.e., azodicarbonamide modified with zinc oxide, calcium carbonate or the like to lower the decomposition temperature, 5-phenyltetrazole, dinitrosopentamethylene tetramine, azobisisobutyronitrile, diazoaminobenzene, oxybis(benzenesulfonylhydrazide) and the like.

Inorganic Chemical Blowing Agents:

Carbonates such as for example sodium bicarbonate $NaHCO_3$. It decomposes at a temperature range of from 150 to 230° C. and liberates 140 to 230 ml/g of gas, mostly $CO_2$ and $H_2O$.

Other examples include sodium borohydride, ammonium carbonate, and modified sodium bicarbonate, i.e. sodium bicarbonate modified with a proton donor such as citric acid, and the like.

The amount of blowing agent added to the polyolefin is of at least 0.2 wt % based on the total weight of layer B, preferably of at least 1 wt %. It can be of at most 5 wt %, preferably of at most 3 wt %. In some embodiments, preferred amount is of about 2.5 wt %. The chemical blowing agent totally decomposes upon foaming.

3.4. Preparing the Optionally Foamed Polyolefin Layer C

The foamed polyolefin layer can be prepared by standard techniques with one or more chemical blowing agent(s). The chemical blowing agent can be incorporated into the polyolefin to form a blend. The blend may be prepared by extruding the polyolefin either with a masterbatch comprising the chemical blowing agent or directly with the blowing agent. In both cases, it is preferred that the extrusion temperature is kept above the melt temperature of the polyolefin but below the decomposition temperature range of the chemical blowing agent(s). The melt can then be passed through a suitable die, such as used with a pelletizer, to obtain the pelletized resin.

Alternatively, and preferably, the polyolefin can be dry blended with the chemical blowing agent(s) and introduced directly into the mould during the rotomoulding cycle. Dry blending is favored over compounding the chemical blowing agent with the polyolefin, because the mixing has to be carried out below the decomposition temperature of the chemical blowing agent.

While it is not necessary, additives which function to control or modify foam cell size or foam density or modify/control the activator temperature or rate of decomposition of the chemical blowing agent may also be included in the polyolefin. Useful additives of this type include calcium carbonate, titanium dioxide, zinc oxide, talc, calcium stearate, nanocomposites and the like. When present, the amount of these additives typically ranges from about 0.01 wt % to about 1 wt % (percent by weight), based on the weight of the foamed polyolefin layer.

The preferred density of the foamed layer is between 100 to 200 $kg/m^3$.

The preferred thickness of the foamed layer can be ranging from 10 to 500 mm, preferably from 100 to 200 mm, according to the desired use of the rotomoulded article.

4. Optional Layer D

In particular embodiments, the rotomoulded article described herein may comprise one or more further layers D, in addition to the layer(s) A, layer(s) B and (optional) layer(s) C described above. Layer D is preferably adjacent to layer C. In a particular embodiment, layer D is adjacent to layer C, which is adjacent to layer B, which is adjacent to a layer A. A layer A is preferably an outer lay in this case, layers B and C intermediate layers and layer D an inner layer. Layer D can be the same as or different from layer B.

In particular embodiments, layer D has an average thickness ranging between 50 µm and 5 mm.

4.1. Polyolefin

Layer D can comprise a polyolefin. The polyolefin is preferably present in an amount ranging from 50 wt % based on the total weight of layer D, for example ranging from 60 wt %, for example ranging from 70 wt %, for example ranging from 80 wt %, for example ranging from 90 wt %, for example ranging from 95 wt %, up to 100 wt % of layer D, or up to 100% for example up to 99.8 wt %, for example up to 99 wt %, for example up to 97.5 wt %, for example up to 97 wt %, or for example up to 95 wt % wt % of layer D.

The polyolefin can be the same as or different form the polyolefin present in layer C.

The polyolefin can be selected from polyethylene, polypropylene, polybutene or polyhexene.

Preferably, the polyolefin is polyethylene. The description of polyethylene optionally present in layer B applies mutatis mutandis to the polyethylene in layer D, which can be the same as or different from any polyethylene present in layer B.

The composition for layer D can be in powder or micropellet form, suitable for rotational moulding.

4.2. Further Optional Components

In another embodiment, particularly when layer D is the inner, layer D may also comprise other components besides the polyolefin. For example, it may comprise:

from 50 to 99.5 wt %, preferably 60 to 99.4 wt %, of the polyolefin, which can be different from the polyolefin of layer B, from 0 to 50 wt %, preferably 0.5 to 50 wt %, more preferably 0.5 to 30 wt %, of a polyester (preferably PLA), which can be different from the polyester of layer B, from 0 to 20 wt %, preferably 0.1 to 15 wt %, of a co- or ter-polymer, which can be different from the co- or ter-polymer of layer B, comprising:
 a. 50 to 99.9 wt % of an ethylene or a styrene monomer,
 b. 0.1 to 50 wt % of an unsaturated anhydride-, epoxide- or carboxylic acid-containing monomer,
 c. 0 to 50 wt % (meth)acrylic ester monomer.

The description of the polyester (section 2.1 above) and the co- or ter-polymer (section 2.3 above) present in layer B applies mutatis mutandis to layer D. The optional polyester (preferably PLA) and the optional co- or ter-polymer can be the same as or different from those present in layer B. Layer D can be the same as or different from layer C.

5. The Rotomoulding Process

According to a second aspect, the present invention also encompasses a method for preparing a rotomoulded article according to the first aspect of the invention, comprising the steps of
 (i) applying to at least a part of the interior wall of a mould at least one layer A comprising fibers embedded in a polymer resin;
 (ii) adding to the mould the composition for layer B;
 (iii) rotating and heating the mould;
 (iv) optionally, further adding to the mould the composition for layer C, optionally further adding to the mould the composition for layer D.

The rotomoulded article according to the invention comprises at least one layer A and at least one further layer, more particularly a layer B. The article can be a bi-layered article only having the layer A and layer B, or it can be a multilayered article having three, four, five or more layers. In particular embodiments, the article may comprise a further layer C, preferably adjacent to layer B. In addition, a further layer D may be present, preferably adjacent to layer C.

Rotational moulding is a process well-known to the person skilled in the art. The various processes of rotational moulding usually comprise the following stages:
 a) loading of the mould;
 b) rotation of the mould;
 c) heating of the mould;
 d) cooling; and
 e) release from the mould.

The process for manufacturing the rotomoulded articles described herein is further characterized in that, prior to loading the mould with the material required for the layer B, at least a part of the internal surface of the mould is covered with one or more layers A (fibers which are impregnated with a resin). In case the mould interior is only partially covered with one or more layers of resin-impregnated fibers, the layer(s) A of the rotomoulded article typically cover only a part of the underlying layer (e.g. layer B). In particular embodiments, the mould interior is partially or completely covered with one or more layers of resin-impregnated fibers.

The mould can be made of any material known in the art for rotomoulding. For example, the mould can be an aluminum mould or a Teflon (polytetrafluoroethylene) mould. The mould may also be a Teflon-coated mould, for example a Teflon-coated aluminum mould. Teflon or Teflon-coated moulds are preferred to avoid any sticking to the mould due to the decreased shrinkage and warpage according to the article of the invention. In an embodiment, the mold is coated with a Teflon release agent.

In certain embodiments, the prepregs may be applied to the mould using an automated fiber placement (AFP) machine. Alternatively, the fibers may be applied to the mould first, and subsequently impregnated with the resin. In particular embodiments, a non-permanent adhesive may be used to promote the adherence of the (impregnated) fibers to the mould. An example of a suitable non-permanent adhesive is Surface Enhancer® Gel, available from Mold in Graphic.

Once the layer(s) of resin-impregnated fibers are applied to the internal surface of the mould, the actual process of rotational moulding can be started. More particularly, the material required for layer B can be loaded in the mould, typically in the form of a powder and/or micropellets. The quantity of powder and/or of micropellets introduced into the mould depends on the size of the article and on the desired wall thickness.

Once the required material is loaded in the mould, the mould can be rotated and heated. The rotation of the mould is generally carried out around two perpendicular axes. The heating step (c) of the mould typically occurs simultaneously with the rotation of the mould in step (b).

In one embodiment, the heating step can be carried out in an oven or by electric heating elements. In another preferred embodiment heating can be carried out with a mould heated by an oil-filled heating jacket, as in for example, the Leonardo® rotomoulding machine from Persico®. The heating temperature of the oven, electric heating elements or oil can vary from 150 to 350° C. One generally uses a temperature of at least of 10° C. higher, preferentially at least of 20° C. higher, more preferentially at least of 30° C. higher compared to the melting point of the layer that one wishes to mould. A heating temperature ranging from 180 and 270° C. is preferably used. In another embodiment, heating can also be carried out by microwaves.

The duration of the moulding varies according to dimensions and the thickness of rotomoulded article, and typically ranges from 5 to 600 minutes.

The coating of the mould with the resin-impregnated fibers prior to loading of the mould results in an optimal contact between layers A and B. The inventors have further found that an excellent adherence between the layers A and B is obtained, particularly if the resin is an epoxy resin. Moreover, the process described herein results in articles having a smooth surface, even when a layer A only partially covers the surface of the article.

The heating of the mould is not only useful for preparing layer B and optionally other layers, but typically at least partially induces curing of the resin in which the fibers are embedded. As used herein, "cure" and "curing" refers to polymerizing and/or cross-linking processes.

In some cases however, further curing of the resin may be required. Further curing of a partially cured resin typically increases the glass transition of the resin. Accordingly, in particular embodiments, the rotomoulding process described herein may comprise a dedicated curing step. In this curing step, the mould is typically heated, with or without rotation of the mould. The duration of the curing step and the mould temperature during the curing step typically depend on the optimal curing temperature of the resin, and the melting point of the other layer(s).

After completion of the layer(s) and optional curing, the mould and the article contained by the mould are typically cooled.

The duration and the time of cooling step depends on the installation, on the dimensions of the article to be moulded and of the type of article which one wishes to obtain. As mentioned previously, it is possible to cool the mould and/or the article contained in the mould. To cool the mould from the outside, one can use air at room temperature, water between 5 and 25° C. or oil between 5 and 80° C. To cool the article from the inside of the mould, one can inject air and/or inert gas such as nitrogen and/or spray water (like a mist) within the interior of the mould, for example at a temperature of 25° C. The time of cooling generally varies between 5 and 500 minutes depending on the thickness of the rotomoulded article and the process used for cooling. When the article has a thickness of more than 10 mm, the mould should preferably be cooled from both the inside of the mould and the outside, preferably using air or inert gas such as nitrogen or a spray of water (mist).

According to a mode of realization, the cooling of the mould and/or article obtained are done in just one step until a temperature ranging between room temperature and a temperature lower than 100° C. is obtained. Thereafter, the article is released from the mould. Release of the article from the mould is generally carried out when the article has sufficient rigidity. The release from the mould is generally done at a temperature lower than 100° C.

According to a particular mode of realization, the cooling of the mould and/or article comprises the following steps:
  i. cooling until a temperature ranging between 100° C. and 150° C., preferably between 100° C. and 130° C., is reached,
  ii. maintaining this temperature for 0 to 60 minutes,
  iii. cooling again until a temperature ranging between the room temperature and a temperature lower than 100° C. is reached.

Thereafter, the article is released from the mould.

The rotational moulding can be carried out under inert gas in the absence of oxygen. In order to do so, one can for example add into the mould a compound which liberates carbon dioxide, such as dry ice. This can be for example together with the powder or pellets of the different components. Dry ice generates carbon dioxide during the heating and rotating steps of the moulding process. One can also purge the mould with an inert gas, such as nitrogen, by injecting nitrogen after closing the mould.

The walls of the articles can comprise one or more successive layers, at least having layers A and B as claimed. It is thus possible to manufacture articles with walls comprising for examples two or three layers e.g. optionally having a layer C and layer D. In one embodiment, layer C can be foamed.

In a particular embodiment, layer A is the outer layer, layers B and C are intermediate layers and layer D is the inner layer. In this particular embodiment, layer D may further comprise a polyester and optionally a co- or terpolymer according to the same definitions as in layer B. Layer D can be same as or different from layer B.

In another embodiment, layer B is the intermediate layer adjacent to layers C and D, wherein layers C and D are either an inner layer adjacent to layer A or an inner layer respectively. Layers C and D can be same or different in this embodiment.

There are several known methods to manufacture multi-layered rotomoulded articles: by manual introduction of material during the rotomoulding cycle, or by the use of a drop-box, or by a one-shot system wherein each layer has a different melting temperature and are introduced into the mould together.

Manual addition involves moving the mould from the oven, removing a vent tube or plug that creates an opening in the part and adding more material using a funnel or wand. This operation must be repeated for each additional layer.

A drop-box typically contains the material for a particular layer and it is an insulated container that holds material until it is released at the appropriate time during the cycle. The signal for release of material is usually transmitted as a pressure pulse via the airline through the arm of the machine. The insulation is kept cool to prevent the material inside the box from melting.

In either of these two methods, there are two factors to consider, which are in fact known to the skilled person in multilayered rotomoulding applications:
  i. the temperature at which the subsequent layer is added for determining the wall thickness of the previous skin formed and how well the two layers may be bound together;
  ii. the time elapsed before addition of the subsequent layer of material to avoid sag.

It is possible to control these by lowering the melt index of the first layer and/or by reducing the injection temperature of the next layer, and/or by cooling the mould slightly before injection of the next layer.

The cycle time necessary to produce multilayer rotomoulded articles depends upon the number of layers and upon the mass injected for each layer.

The present invention also discloses a method for rotomoulding the articles according to the invention comprising the steps of
  (i) applying to at least a part of the interior wall of a mould at least one layer A comprising fibers embedded in a polymer resin;
  (ii) adding to the mould the composition for layer B;
  (iii) rotating and heating the mould;
  (iv) optionally, further adding to the mould the composition for layer C, optionally further adding to the mould the composition for layer D.

More particularly, the method of rotomoulding may comprise the steps of (in no particular order):
  a) applying to at least a part of the internal surface of a mould one or more layers of fibers impregnated with a resin;
  b) loading the composition for layer B into the mould;
  c) placing the loaded mould in a (pre-heated) oven;
  d) rotating the loaded mould about two perpendicular axes;
  e) optionally further heating the mould for curing the resin;
  f) optionally feeding the composition for layer C, optionally with a chemical blowing agent and blowing gas, to prepare a foamed layer C, followed by repeating steps (c) and (d);
  g) optionally feeding the composition for layer D, followed by repeating steps (c) and (d);
  h) optionally feeding desired additional layers, each addition followed by repeating steps (b) and (c),
  i) cooling and retrieving the rotomoulded article.

Steps b), c) and f) to i) are well-known to the skilled person and relate to a typical rotomoulding process. Steps a) and e) have been discussed above. Preferably, the process is carried out in the order described.

The time at which the temperature inside the mould reaches the melting temperature of the composition for layer B, can be used to determine the injection point of layer C. Composition for layer C (if adjacent to layer B) comprising polyolefin (and optionally a chemical blowing agent) is injected as soon as or just before that first melting temperature is reached. The composition for layer C is preferably injected at an internal air temperature situated between 125 and 160° C.

The time at which the temperature inside the mould reaches the melting temperature of composition for layer C, can be used to determine the injection point of layer D. Composition for layer D is injected as soon as or just before that second melting temperature is reached. The composition for layer D is injected at an internal air temperature situated between 125 and 160° C. The internal air temperature must be compatible with the temperature and is preferably of at most 170° C. during the whole cycle time.

The articles obtained by rotational moulding are generally hollow parts without any welding lines, such as for example structural parts, tanks, drums, containers, vats, jerrycans, cans, cisterns, boxes, bumpers, furniture (bath tubs), car parts such as car doors, car bodies and car seats, nautical and aquatic equipment, buoys, floats, airplane parts, boards, planks and joints. The rotomoulded article is preferably selected from the group comprising car parts. Among the car parts, one can for example quote the car body and car door and interior components such as the instrument panel and door handles.

These articles can have one or more openings and/or inserts of plastic or metal and/or "kiss offs" which are reinforcing junctions or bridges between two surfaces within the article.

Articles obtained by the rotational moulding process according to the invention typically do not have a point of weakness. They show homogeneous characteristics, such as for example a uniform thickness of the walls as well as a good surface aspects both internally and internally and externally, without any deformation, bubble or other defects. In addition, the compositions for use in the present process do not present any sagging behavior during the rotomoulding process.

In particular, the articles obtained have a very little shrinkage and warpage. The presence of layer A and the (optional) presence of the co- or terpolymer (compatibilizing agent) in layer B increases the impact strength of the article.

6. Filling with Polyurethane

The articles obtained by rotational moulding are generally hollow parts without any welding lines. Being hollow, the rotomoulded articles according the present invention typically comprise one or more cavities. In an embodiment, enhanced insulation properties or structural properties can be obtained by filling these cavities with a polyurethane (PU), such as a polyurethane foam.

The inventors found that for the rotomoulded articles according to the present invention the adherence between the article inner wall and a PU foam is excellent.

Accordingly, in particular embodiments, the present rotomoulded articles comprise at least one cavity which comprises, preferably which is filled with a polyurethane, such as a polyurethane foam.

PU foams can greatly enhance the structural and insulating properties of the rotomoulded article, without adding much weight to the article. The PU foam may be a rigid, semi-rigid, or soft PU foam. Rigid PU foams are preferred to enhance the structural properties of the rotomoulded article. The softness and elastic properties of the polyurethane foams depend on the choice of the polyol and isocyanate monomers, as the polyol monomers typically provide soft domains, and the isocyanate monomers form harder domains.

The type of PU polymer comprised by the PU foam is not critical to the present invention. The PU polymer may be made by introduction into the rotomoulded article of a PU forming composition as described below.

The filling with PU foam can be obtained by introducing a PU forming composition into one or more cavities of the rotomoulded article.

In general, such a PU forming composition comprises:
at least one isocyanate compound, hereinafter also referred to as "isocyanate monomer"; and
at least one polyol, hereinafter also referred to as "polyol monomer".

Suitable isocyanate monomers include polyisocyanates, such as diisocyanates and/or triisocyanates. The polyisocyanates may be aliphatic, araliphatic and/or aromatic polyisocyanates, typically of the type $R^2$—$(NCO)_x$ with x being at least 2 and $R^2$ being an aromatic, aliphatic or combined aromatic/aliphatic group. Examples of $R^2$ are diphenylmethane, toluene, dicyclohexylmethane, hexamethylene, or groups providing a similar polyisocyanate.

Non-limiting examples of suitable polyisocyanates are diphenylmethane diisocyanate (MDI)—type isocyanates in the form of its 2,4'-, 2,2'- and 4,4'-isomers and mixtures thereof (also referred to as pure MDI), the mixtures of diphenylmethane diisocyanates (MDI) and oligomers thereof (known in the art as "crude" or polymeric MDI), and reaction products of polyisocyanates (e.g. polyisocyanates as set out above), with components containing isocyanate-reactive hydrogen atoms forming polymeric polyisocyanates or so-called prepolymers. Other examples are tolylene diisocyanate (also known as toluene diisocyanate, and referred to as TDI), such as 2,4 TDI and 2,6 TDI in any suitable isomer mixture, hexamethylene diisocyanate (HMDI or HDI), isophorone diisocyanate (IPDI), butylene diisocyanate, trimethylhexamethylene diisocyanate, di(isocyanatocyclohexyl)methane, e.g. 4,4'-diisocyanatodicyclohexylmethane (H12MDI), isocyanatomethyl-1,8-octane diisocyanate and tetramethylxylene diisocyanate (TMXDI), 1,5-naphtalenediisocyanate (NDI), p-phenylenediisocyanate (PPDI), 1,4-cyclohexanediisocyanate (CDI), tolidine diisocyanate (TODI), any suitable mixture of these polyisocyanates, and any suitable mixture of one or more of these polyisocyanates with MDI-type polyisocyanates.

The polyurethane is generally prepared by reacting an isocyanate monomer with one or more polyol monomers. Suitable polyol monomers include a hydroxyl terminated polyester (polyester polyols), a hydroxyl terminated polyether (polyether polyols), a hydroxyl terminated polycarbonate, or a mixture thereof. In particular embodiments, the polyol monomers comprise one or more monomers selected from the group comprising a polyether diol, a polyether triol, a polyester diol, and a polyester triol.

The polyester polyols may be generally a linear polyester, and may have an average molecular weight (Mn) of from about 500 to 10000. The molecular weight may be determined by assay of the terminal functional groups and is related to the number average molecular weight. The polymers can be produced by (1) an esterification reaction of one or more glycols with one or more dicarboxylic acids or anhydrides or (2) by transesterification reaction, i.e. the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from caprolactone and a bifunctional initiator such as diethylene glycol. The dicarboxylic acids of the desired polyester can be aliphatic, cycloaliphatic, aromatic, or combinations thereof. Suitable dicarboxylic acids which can be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. The glycols which are reacted to form a desirable polyester intermediate can be aliphatic, aromatic, or combinations thereof, and have a total of from 2 to 12 carbon atoms, and include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like.

Polyether polyols may be derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly (ethylene glycol) comprising ethylene oxide reacted with ethylene glycol, poly(propylene glycol) comprising propylene oxide reacted with propylene glycol, poly(tetramethyl glycol) (PTMG) comprising water reacted with tetrahydrofuran (THF). Polyether polyols further include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of glycerol and ethylene oxide or glycerol and propylene oxide.

Hydroxyl terminated polycarbonate intermediates can be prepared by reacting a glycol with a carbonate. U.S. Pat. No. 4,131,731 is hereby incorporated by reference for its disclosure of hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and preferably 4 to 12 carbon atoms, and from polyoxyalkylene glycols containing 2 to 20 alkoxy groups per molecule with each alkoxy group containing 2 to 4 carbon atoms. Diols suitable for use in the present invention include aliphatic diols containing 4 to 12 carbon atoms such as butanediol-1,4, pentanediol-1,4, neopentyl glycol, hexanediol-1,6, 2,2,4-trimethylhexanedion-1,6, decanediol-1,10, hydrogenated dilinoleylglycol, hydrogenated diolelylglycol; and cycloaliphatic diols such as cyclohexanediol-1,3, dimethylolcyclohexane-1,4, cyclohexanediol-1,4, dimethylolcyclohexane-1,3, 1,4-endomethylene-2-hydroxy-5-hydroxymethyl cyclohexane, and polyalkylene glycols. The diols used in the reaction may be a single diol or a mixture of diols depending on the properties desired in the finished product.

Non-limiting examples of suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate and 2,4-pentylene carbonate.

Also suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Preferred examples of diarylcarbonates, which can contain 6 to 20 carbon atoms in each aryl group, are diphenylcarbonate, ditolylcarbonate and dinaphthylcarbonate.

The reaction is carried out by reacting a glycol with a carbonate, preferably an alkylene carbonate in the molar range of 10:1 to 1:10, but preferably 3:1 to 1:3 at a temperature of 100° C. to 300° C. and at a pressure in the range of 0.1 to 300 mm Hg in the presence or absence of an ester interchange catalyst, while removing low boiling glycols by distillation.

In particular embodiments, the PU forming composition can comprise one or more polyether diols or triols. The choice of polyol monomer may depend on the required specifications of the rotomoulded, PU filled article. For example, polyethers typically provide a better microbial and fungal resistance, are easier to process (due to the lower viscosity), and have a lower cost, compared to polyesters. On the other hand, polyesters may provide a better wear resistance; load bearing properties; heat aging properties; reactivity; and oxygen, ozone and UV stability. Polyesters may further swell less in oils, grease and solvents.

The PU forming composition may further comprise one or more chain extenders, all of which are well known to those skilled in the art. Non-limiting examples of suitable chain extenders are lower aliphatic or short chain glycols having from about 2 to about 10 carbon atoms and include, for instance, ethylene glycol, diethylene glycol, propylene glycol, dipropylene glycol, 1,4-butanediol, 1,6-hexanediol, 1,3-butanediol, 1,5-pentanediol, 1,4-cyclohexanedimethanol, hydroquinone di(hydroxyethyl)ether, neopentylglycol, and the like.

In particular embodiments, the PU formulation can comprise one or more catalysts, for example selected from the group comprising a tertiary amine, such as bis-(2-dimethylaminoethyl)ether, N-ethylmorpholine, triethylenediamine, dimethylcyclohexylamine, or dimethylethanolamine; and an organotin compound, such as dibutyltin dilaurate, dioctyltin mercaptide, or dibutyltin oxide.

In certain embodiments, the PU forming composition may comprises one or more mineral fillers such as certain oxides, carbonates, silicates, borates, stannates, mixed oxide hydroxides, oxide hydroxide carbonates, hydroxide silicates, or hydroxide borates, or a mixture of these substances. By way of example, use may be made of calcium oxide, aluminum oxide, manganese oxide, tin oxide, boehmite, dihydrotalcite, hydrocalumite, or calcium carbonate.

In certain embodiments, the PU forming composition may comprise one or more foam stabilizers. Foam stabilizers are substances which promote the formation of a regular cell structure during foaming. Non-limiting examples of foam stabilizers are silicone-comprising foam stabilizers such as siloxane-oxalkylene copolymers or other organopolysiloxanes, alkoxylation products of fatty alcohols, oxo alcohols, fatty amines, alkylphenols, dialkylphenols, alkylcresols, alkylresorcinol, naphthol, alkylnaphthol, naphthylamine, aniline, alkylaniline, toluidine, bisphenol A, alkylated bisphenol A, and polyvinyl alcohol.

The PU forming composition can further comprise one or more solvents, as known by the person skilled in the art.

The polyurethane is generally made from the abovementioned polyol monomer, preferably polyether, which is further reacted with an isocyanate monomer, preferably a diisocyanate, along with one or more additives selected from a chain extender, a catalyst, a foam stabilizer, a filler, a dye, a pigment, a flame retarder, an antioxidant, a fungicide, and a biocide.

Foams can be made by using chemical or inert blowing agents while conducting above reactions, or by using a gas in order to create a froth during these reactions. A particularly suitable chemical blowing agent is water. Water can react with isocyanate functional groups, thereby releasing carbon dioxide, which can act as blowing gas. Accordingly, in particular embodiments, the PU forming composition comprises water.

The amount of blowing agent present in the PU forming mixture influences the density of the PU foam formed by the PU forming composition.

EXAMPLES

The following examples illustrate the invention, but by no means intend to limit the scope of the invention.

Example 1

Materials Used in the Example
Layer B: PLA

As the polyester a PLA was used, namely a poly-L-lactide (PLLA) in the form of powder obtained after grinding pellets of PLLA (NatureWorks® PLA polymer 6201 D). The average particle size of the particles of the powder after grinding is of 300 μm.

Physical Properties of the PLA:
  Specific Gravity at 25° C. of 1.24 measured according to D792.
  Melt density at 230° C. of 1.08.
  Melt index measured at 210° C. under a load of 2.16 kg of 15-30 g/10 min measured according to D1238.
  Glass transition temperature of 55-60° C. measured according to D3417.
  Crystalline melt temperature of 160-170° C. also measured according to D3418.

Layer A: Polymer Resin Impregnated Fibers

For the experiments, two different carbon fiber prepregs were used:

A prepreg comprising carbon fibers impregnated with HexPly® M77, and a prepreg comprising carbon fibers impregnated with impregnated with Cycom® 977-2.

HexPly® M77 from Hexcel: is a epoxy resin matrix, preferably cured between 80° C. and 160° C.; having a Tg after 130° C. at 15 min of 125° C. (DMTA 30-180° C., 2° C./min) and a density of 1.22 g/cm³.
  Cycom® 977-2 from Cytec: is a 177° C. curing toughened epoxy resin with a 126-138° C. dry and 104° C. wet service capability having a Tg of about 212° C. (RDS, 10° C./minute) and a density at room temperature of 1.31 g/cm³.

Rotomoulded Articles:

Five bottles (bottles no 1, 2, 3, 4) were manufactured using as layer A Cycom® 977-2 resin impregnated carbon fiber prepreg, and as layer B: PLA, and two bottles (bottles no 5 and 6) were manufactured using as layer A: HexPly® M77 resin impregnated carbon fiber prepreg, and as layer B: PLA.

A carousel oven machine was used, with Teflon-coated Aluminum moulds. Cooling of the moulds was obtained via external air cooling only. Air was used at room temperature (between 20 to 25° C.). For each bottle, the prepreg only covered a part of the mould. Surface Enhancer® Gel (obtained from Mold in Graphic) was used for enhancing the adherence of the prepreg to the mould. After application of the prepreg, 900 g of PLA powder were loaded in the mould, followed by manufacturing the bottle by rotational moulding.

For the moulds comprising the Cycom® 977-2 resin impregnated fibers, the parameters of the cycle were the following:
  Heating of the oven to a temperature of about 310° C.;
  PIAT (peak internal air temperature): about 220° C.;
  Cooling of the mould from the outside from at a rate of 10° C./minute using air at room temperature;
  Removed from the oven at 160° C. (internal air temperature).

Figure 1B:
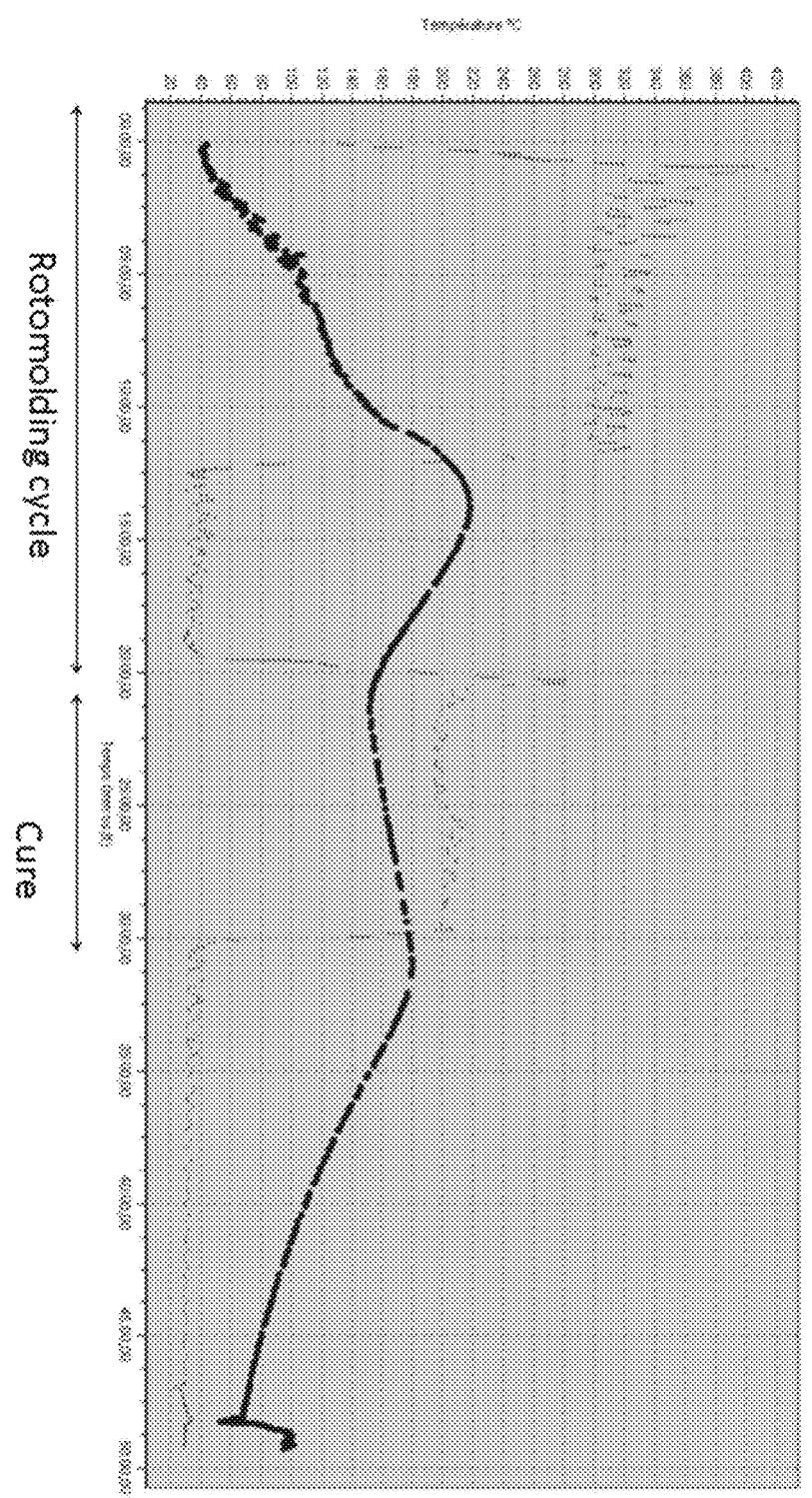
Figure 1C:
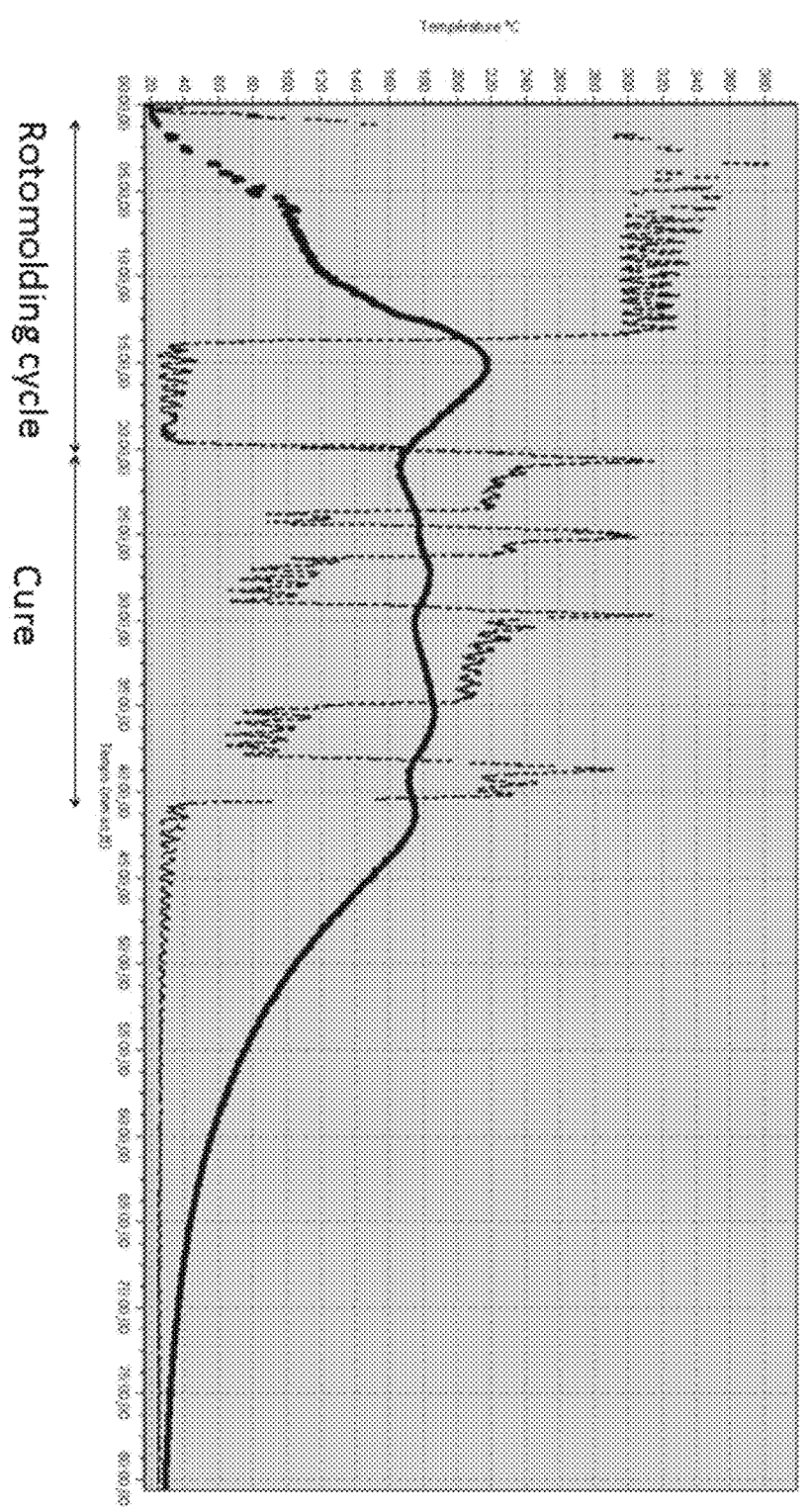
Figure 1D:
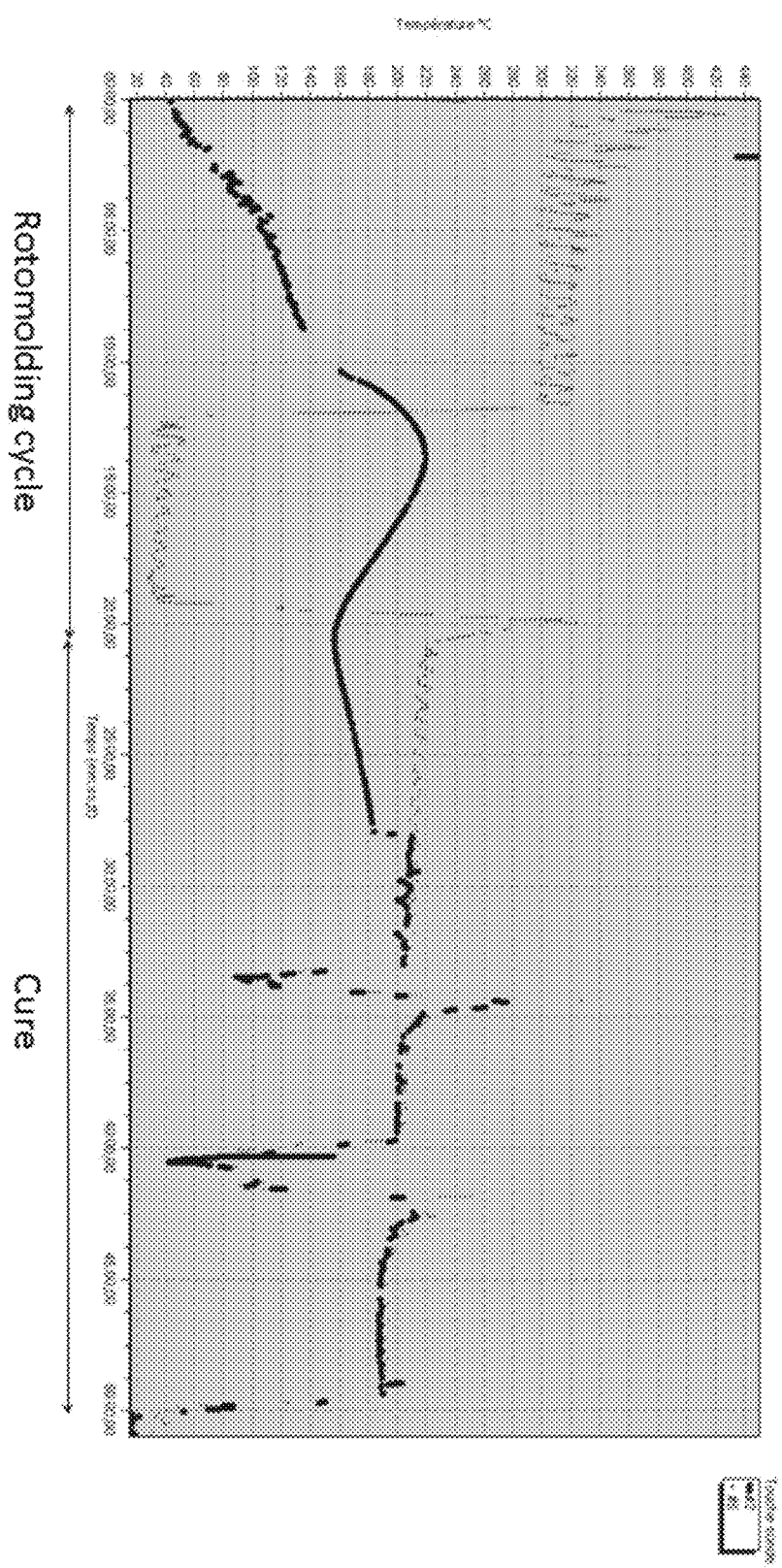

After cooling to 160° C., all the moulds were subject to a further curing step. In this step, the moulds were re-heated in the oven for 5, 10, 20, and 30 minutes, respectively, at an oven temperature of about 225° C. FIG. 1A represents a graph showing the temperature cycle of the rotomoulding process for bottle 1, including a 5 minutes curing step. FIG. 1B represents a graph showing the temperature cycle of the rotomoulding process for bottle 2, including a 10 minutes curing step. FIG. 1C represents a graph showing the temperature cycle of the rotomoulding process for bottle 3, including a 20 minutes curing step. FIG. 1D represents a graph showing the temperature cycle of the rotomoulding process for bottle 4, including a 30 minutes curing step.

For the moulds comprising the HexPly® M77 resin impregnated fibers, the parameters of the cycle were the following:
  Heating of the oven to a temperature of about 310° C.;
  PIAT (peak internal air temperature): 215° C. (bottle 6) and 225° C. (bottle 7);
  Cooling of the mould from the outside from at a rate of 10° C./minute using air at room temperature;
  Removed from the oven at 160° C. (internal air temperature).

Figure 1E:
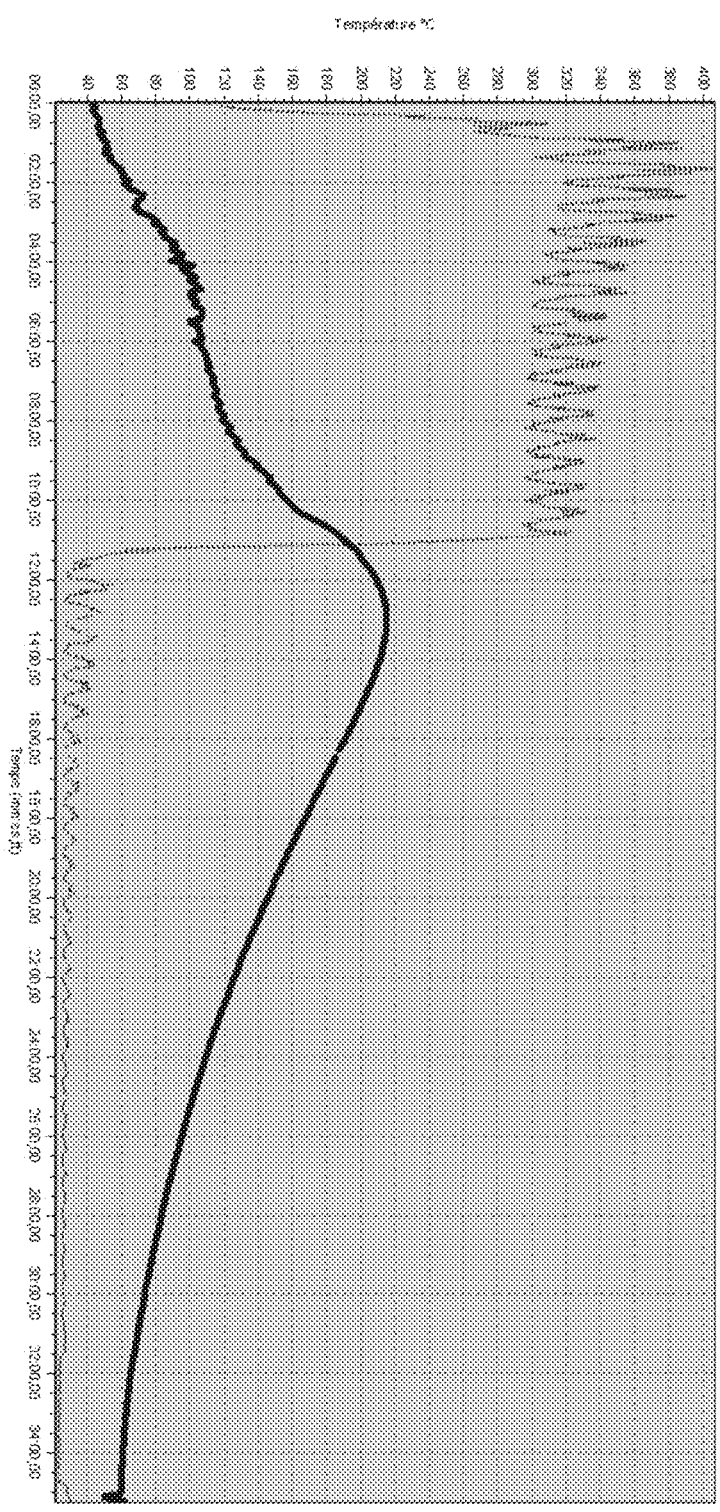
Figure 1E:
Figure 1F:
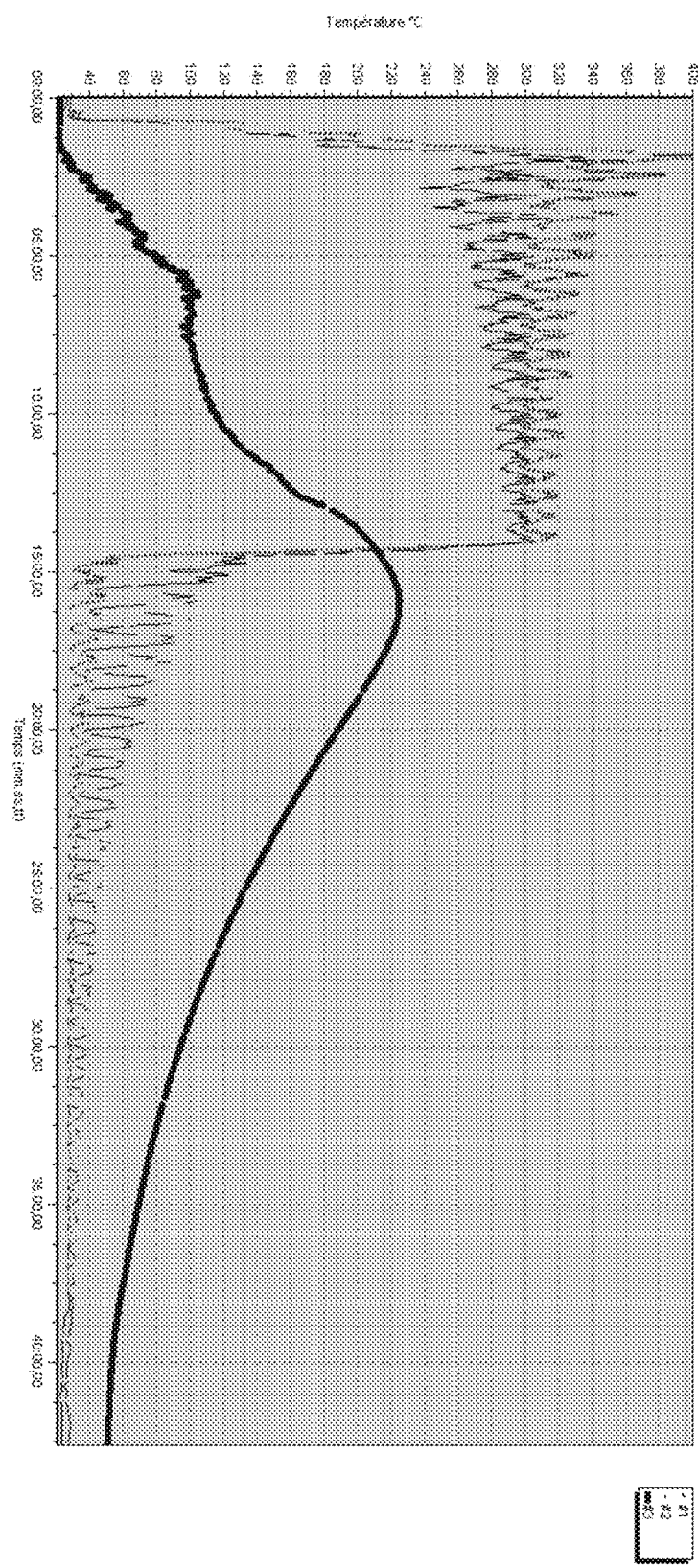
Figure 2:
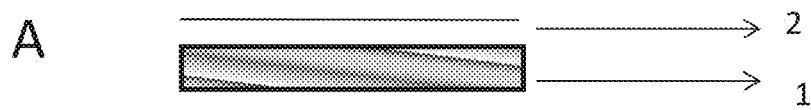
FIGS. 2A, 2B, 3A, 3B, 4A, 4B, 5A and 5B represent schematic overviews of the layer structure for various embodiments of the rotomoulded articles described herein.
Figure 2:
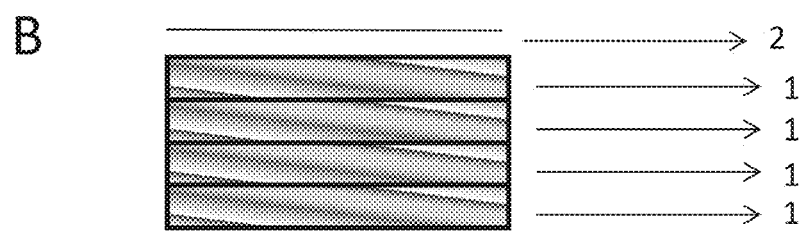
Figure 3:
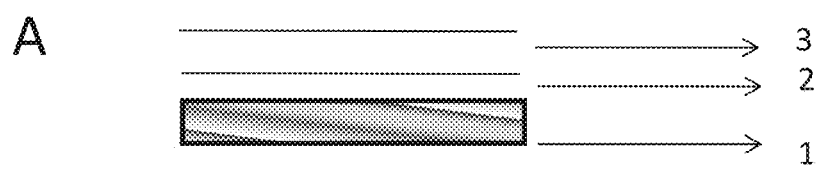
Figure 3:
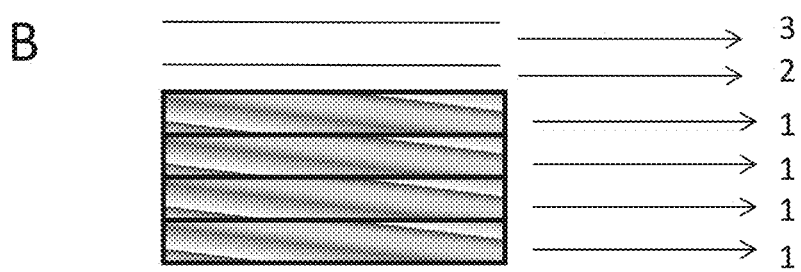

FIGS. 1E and 1F represent graphs showing the temperature cycle of the rotomoulding process for bottles 5 and 6 respectively.

All bottles showed an excellent adherence between the layer comprising the fibers (layer A) and the PLA layer (layer B).

For all bottles, the glass transition temperature of the epoxy resin prepreg after the rotomoulding process was measured via DSC (according to ISO 11357) and compared with the Tg given in the manufacturer's specification ("Target Tg"). DSC analysis: A sample from the bottle comprising the prepreg as layer A and PLA as layer B, was heated from 25° C. to 300° C. at 10° C./min under $N_2$ inert atmosphere.

For all bottles, the number averaged molecular weight (Mn) and weight averaged molecular weight (Mw) of the PLA after processing was determined via gel permeation chromatography (GPC) analysis. A reference analysis was performed on the PLA prior to processing. The measurement of the molecular weights was carried out at 30° C. by using a liquid chromatograph WATERS 610. A solution of the polymer in chloroform at a concentration of 1 mg/mL was prepared. 100 μl of this solution is injected, through a filter having pores of 0.2 μm in diameter, in the column of the chromatograph at 30° C. The molecular weight is given on the basis of the retention time in the column. One sample is carried out as the reference using standard polystyrene samples and a universal calibration curve.

The results are summarized in Table 1. It is clear that with the HexPly® M77 resin, the rotomoulding process results in a Tg of the epoxy prepreg close to the target Tg. This indicates that the epoxy resin has been cured sufficiently, without requiring a separate curing step. On the other hand, the Cycom® 977-2 prepreg only has a HDT of about 50 to 55° C. without separate curing step, indicating an incomplete curing of the process. An additional curing step of 5 minutes or more results in a Tg above 80° C., indicating that the resin has been cured further. For most applications, a Tg above 80° C. is considered adequate.

The GPC analysis shows that for all analyzed bottles, the molecular weight of the PLA is almost identical before and after the process. This indicates that no significant degradation of the PLA occurs during the process.

Figure 4:
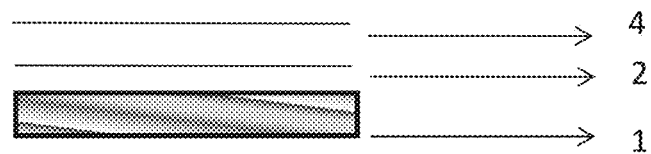
Figure 4:
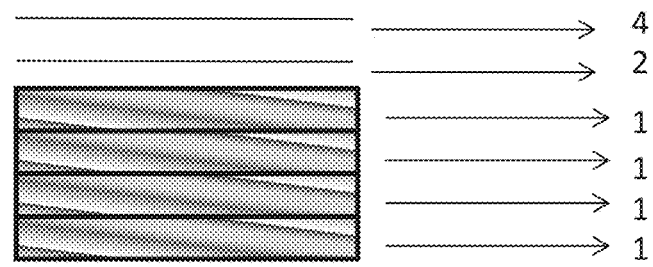

FIG. 4A represents a structure comprising one outer layer A (numbered 1 in FIG. 4A), an inner foamed layer C (numbered 4 in FIG. 4A) and an intermediate layer B (numbered 2 in FIG. 4A). Layer B can have a thickness ranging from 50 μm to 5 mm. Foamed layer C can have a thickness ranging from 5 mm to 100 mm. FIG. 4B represents a similar structure, comprising a plurality of outer layers A (numbered 1 in FIG. 4B). Structure of FIG. 4B can comprise up to 10 layers A.

Figure 5:
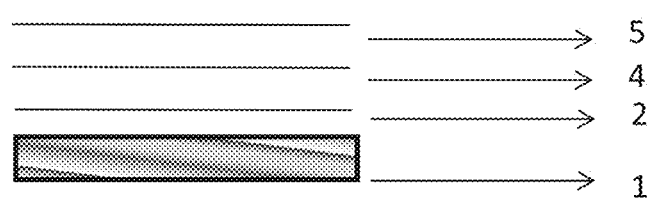
Figure 5:
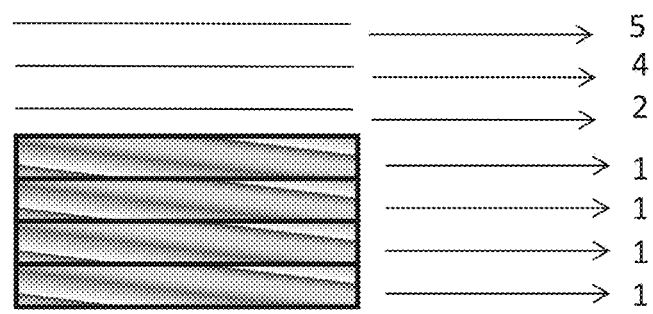

FIG. 5A represents a structure comprising one outer layer A (numbered 1 in FIG. 5A), a first intermediate layer B (numbered 2 in FIG. 5A), a second intermediate foamed layer C (numbered 3 in FIG. 5A), and an inner layer D (numbered 5 in FIG. 5A). Layer B can have a thickness ranging from 50 μm to 5 mm. Foamed layer C can have a thickness ranging from 5 mm to 100 mm. Layer D can have a thickness ranging from 0.5 mm to 10 mm. FIG. 5B represents a similar structure, comprising a plurality of outer layers A (numbered 1 in FIG. 5B). Structure of FIG. 5B can comprise up to 10 layers A.

TABLE 1

| Bottle nr. | | Epoxy resin | Prepreg Tg/° C. | Epoxy resin target Tg/ ° C. | GPC PLA Mn | GPC PLA Mw |
|---|---|---|---|---|---|---|
| Reference (PLA before processing) | | — | — | — | 95000 | 155000 |
| 1 | NC + 5 min cure | Cycom ® 977-2 | 112 | 212 | 79078 | 150940 |
| 2 | NC + 10 min cure | Cycom ® 977-2 | 90 | 212 | 82101 | 155865 |
| 3 | NC + 20 min cure | Cycom ® 977-2 | 108.7-150.8 | 212 | 80598 | 157813 |
| Substitute Specification - Clean | | | | | | |
| 4 | NC + 30 min cure | Cycom ® 977-2 | 114.5-141.6 | 212 | 86942 | 159066 |
| 5 | Cycle 1 | HexPly ® M77 | 121.9 | 125 | 81369 | 156737 |
| 6 | Cycle 2 | HexPly ® M77 | 130.1 | 125 | 76583 | 148069 |

Example 2

Different multilayered rotomoulded articles can be made according to the invention. FIGS. 2A, 2B, 3A, 3B, 4A, 4B, 5A and 5B represent schematic cross sectional views of multilayered rotomoulded structures for various embodiments of the rotomoulded articles described herein; wherein layers A, B, C and D have the compositions as described in the present specification and claims.

FIG. 2A represents structure comprising one outer layer A: prepreg (numbered 1 in FIG. 2A) and an inner layer B (numbered 2 in FIG. 2A). Layer B can have a thickness ranging from 50 μm to 5 mm. FIG. 2B represents a similar structure, comprising a plurality of outer layers A (numbered 1 in FIG. 2B) and an inner layer B (numbered 2 in FIG. 2B). Structure of FIG. 2B can comprise up to 10 layers A.

FIG. 3A represents a structure comprising one outer layer A: prepreg (numbered 1 in FIG. 3A), an inner layer C (numbered 3 in FIG. 3A) (layer C) and an intermediate layer B (numbered 2 in FIG. 3A) adjacent to layers A and C. Layer B can have a thickness ranging from 50 μm to 5 mm. FIG. 3B represents a similar structure, comprising a plurality of outer layers A (numbered 1 in FIG. 3B). Structure of FIG. 2B can comprise up to 10 layers A. Structure of FIG. 3B can comprise up to 10 layers A.

The non-foamed PE/PLA layer (3) can have a thickness of about 0.5 mm to 10 mm. In all these examples, the article having the structures shown in FIGS. 2A, 2B, 3A, 3B, 4A, 4B, 5A and 5B may further be filled with a polyurethane foam.

Some exemplary compositions for the various layers are provided below. It will be clear to the skilled person that also other compositions may be suitable.

Exemplary Composition for Polyester Layer B for Structures Illustrated in FIGS. 2A to 5B
  PLA HIGH PURITY from Natureworks 100% wt (as described in Example 1)

Exemplary alternative composition for layer B of structures illustrated in FIGS. 2A to 5B
  PLA HIGH PURITY 77.5% wt (PLA as described in Example 1))
  Red master batch (red pigment): 4% wt
  $CaCO_3$: 10% wt
  MB Transmar®: 0.4% wt
  Irganox 1076 ® (from Ciba): 0.1% wt
  Lotader AX 8900® (from Arkema): 8% wt Exemplary Composition for Layer C of Structures Illustrated in FIGS. 3A to 5B
  Polyethylene M3581 UV® from Total Petrochemicals 86 wt %

PLA high Purity=10 wt % (PLA as described in Example 1)
Green Master batch color (pigment Gymap® GM11725)= 2 wt %
Lotader 8840® (Arkema®)=2 wt %
Exemplary Composition for Layer D of Structures Illustrated in FIGS. 4A to 5B
Polyethylene M3581 UV® from Total Petrochemicals 100 wt %.

The details of some of the used ingredient are given below in layers C or D, are given below:

M3581UV®: M3581UV® is a polyethylene which is sold as pellets by Total Petrochemicals. White polyethylene powders may be obtained after grinding the polyethylene pellets. The polyethylene has a density of 0.935 g/cm$^3$ (ISO 1183) and melt index MI2 of 6 g/10 min (ISO 1133 condition D under a load of 2.16 kg at 190° C.). The average particle size of the powder after grinding is of 300 µm. The polyethylene was prepared with ethylene bis(tetrahydroindenyl) zirconium dichloride catalyst. The tensile modulus is around 800 MPa measured according to ISO527.

Lotader 8890®: LOTADER® AX8890 (sold by Arkema®) is a random terpolymer of ethylene, acrylic ester and glycidyl methacrylate, polymerized under high-pressure in an autoclave process.

Physical properties of Lotader 8890® as sold:
Melt index measured at 190° C. under a load of 2.16 kg of 6 g/10 min measured according to ISO 1133
Methyl acrylate content of 24 wt % as measured by FTIR
Glycidyl methacrylate content of 8 wt % as measured by FTIR
Ethylene monomer of 68 wt % as measured by FTIR
Density (at 23° C.) of 0.94 g/cm3 measured according to ISO 1183
Melting point at 65° C. measured according to ISO 11357-3
Young's modulus of 8 MPa measured according to ASTM D 638 Type IV
Lotader 8840®: LOTADER® AX8840 (sold by Arkema®) is a random copolymer of ethylene and glycidyl methacrylate, polymerized under high-pressure in an autoclave process.
Physical properties of Lotader8840® as sold:
Melt index measured at 190° C. under a load of 2.16 kg of 5 g/10 min measured according to ISO 1133
Glycidyl methacrylate content of 8 wt % as measured by FTIR
Ethylene monomer of 92 wt % as measured by FTIR
Density (at 23° C.) of 0.94 g/cm3 measured according to ISO 1183
Melting point at 106° C. measured according to ISO 11357-3

The manufacture of multilayered rotomoulded articles is known by the skilled person. As an example, a suitable machine and mould configuration for the preparation of an article with a layer architecture as shown in FIG. 2A is the following:
Applying a layer of resin-impregnated fibers to the mould interior;
Adding PLA or a PLA/Polyester composition in the mould;
Heating of the oven to a temperature of 270° C.;
Heating the PLA (or PLA/polyester) up to 180° C. (PIAT 1);
Dropping the PE/PLA composition into the mould;
Heating the PE/PLA composition up to 200° C.;
Cooling of the mould to 120° C. (±10° C.);
Maintaining 20 min at 120° C. (crystallization plateau D);
Cooling to 100-100° C.; and
Demoulding the part at 100-110° C.

The invention claimed is:
1. A rotomoulded article comprising
(i) at least one layer A comprising fibers embedded in a polymer resin;
(ii) at least one layer B comprising:
from 40 to 100 wt % of an aliphatic polyester,
from 0 to 60 wt % of a polyolefin,
from 0 to 20 wt % of a co- or ter-polymer comprising
(a) 50 to 99.9 wt % of ethylene or styrene monomer,
(b) 0.1 to 50 wt % of an unsaturated anhydride-, epoxide- or carboxylic acid-containing monomer,
(c) 0 to 50 wt % of a (meth)acrylic ester monomer, wherein the sum of (a), (b), and (c) is 100%, and
wherein the sum of the wt % of the aliphatic polyester, the polyolefin, and the co- or ter-polymer is 100%; and
(iii) at least one layer C, said layer C comprising
from 50 to 99.4 wt % a polyolefin,
from 0.5 to 50 wt % of a polyester,
from 0.1 to 20 wt % of a co- or ter-polymer, comprising:
a) at least 50 wt % of an ethylene or a styrene monomer,
b) 0.1 to 50 wt % of an unsaturated anhydride-, epoxide- or carboxylic acid-containing monomer,
c) 0 to 50 wt % (meth)acrylic ester monomer, wherein the sum of (a), (b), and (c) equals 100%, and
wherein the sum of the wt % of the polyolefin, the polyester, and the co- or ter-polymer equals 100%.

2. The rotomoulded article according to claim 1, wherein said polymer resin is selected from the group consisting of epoxy resin, epoxy curing agents, polyurethanes, phenolics, phenols, cyanate esters, polyimides, polyesters, benzoxazines, polybenzoxazines, polybenzoxazones, polybenzimidazoles, polybenzothiazoles, polyamides, polyamidimides, polysulphones, polyether sulphones, polycarbonates, polyethylene terephthalates, cyanates, cyanate esters, and polyether ketones, and combinations thereof.

3. The rotomoulded article according to claim 1, wherein said polymer resin comprises an epoxy resin.

4. The rotomoulded article according to claim 1, wherein said layer A has a glass transition temperature (Tg) as determined by Differential Scanning calorimetry (DSC) of at least 60° C.

5. The rotomoulded article according to claim 1, wherein said fibers are selected from the group consisting of carbon fibers, aramid fibers, glass fibers, poly(lactic acid) (PLA) fibers, polypropylene (PP) fibers, PLA stereocomplex fibers, poly(lactic acid)-poly(butylene adipate-co-terephthalate) (PLA-PBAT) fibers, quartz fibers, polyethylene fibers, polyester fibers, graphite fibers, poly-p-phenylene-benzobisoxazole (PBO) fibers, boron fibers, silicon carbide fibers, polyamide fibers, silicon nitride fibers, aluminum oxide fibers, metal fibers, and combinations thereof.

6. The rotomoulded article according to claim 1, wherein at least one layer A is adjacent to said layer B.

7. The rotomoulded article according to claim 1, wherein said aliphatic polyester in layer B is a poly(lactic acid).

8. The rotomoulded article according to claim 1, wherein said polyolefin in layer B is a polyethylene.

9. The rotomoulded article according to claim 1, wherein layer B comprises 0.1 to 50 wt % of said (meth)acrylic ester monomer, and wherein said (meth)acrylic ester monomer is selected from methyl, ethyl, n-butyl, iso-butyl, 2-ethylhexyl, or n-octyl (meth)acrylate.

10. The rotomoulded article according to claim 1, wherein said layer B comprises from 75 to 100 wt % of said aliphatic polyester.

11. The rotomoulded article according to claim 1, wherein the polyolefin in said layer C is a polyethylene.

12. The rotomoulded article according to claim 1, wherein said layer C is foamed.

13. The rotomoulded article according to claim 1, wherein the rotomoulded article further comprises a layer D comprising from 50 to 100 wt % of a polyolefin.

14. The rotomoulded article according to claim 1, wherein the polyolefin of layer C is different from the polyolefin of layer B.

15. The rotomoulded article according to claim 1, wherein the polyester of layer C is different from the polyester of layer B.

16. The rotomoulded article according to claim 1, wherein the co- or ter-polymer of layer C is different from the co- or ter-polymer of layer B.

\* \* \* \* \*